(12) United States Patent
Comeaux et al.

(10) Patent No.: US 10,572,884 B1
(45) Date of Patent: Feb. 25, 2020

(54) SYSTEMS AND METHODS OF DETECTING AND MITIGATING MALICIOUS NETWORK ACTIVITY

(71) Applicant: UIPCO, LLC, San Antonio, TX (US)

(72) Inventors: Jansey Comeaux, Youngsville, LA (US); Michael Scott McQuarrie, San Antonio, TX (US); Gregory Sansone, San Antonio, TX (US); Veronica Santiago, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 114 days.

(21) Appl. No.: 15/952,484

(22) Filed: Apr. 13, 2018

Related U.S. Application Data

(60) Provisional application No. 62/485,124, filed on Apr. 13, 2017.

(51) Int. Cl.
| | |
|---|---|
| *G06F 21/00* | (2013.01) |
| *G06Q 30/00* | (2012.01) |
| *H04L 29/06* | (2006.01) |
| *G06N 20/00* | (2019.01) |
| *G06F 16/951* | (2019.01) |
| *G06F 21/55* | (2013.01) |

(52) U.S. Cl.
CPC ....... *G06Q 30/0185* (2013.01); *G06F 16/951* (2019.01); *G06F 21/554* (2013.01); *G06N 20/00* (2019.01); *H04L 63/14* (2013.01); *H04L 63/1416* (2013.01)

(58) Field of Classification Search
CPC ........ G06F 21/50; G06F 21/55; G06F 21/552; G06F 21/554; H04L 63/14; H04L 63/1408; H04L 63/1416; H04L 63/1425; H04L 63/1433; H04L 63/1441; G06Q 20/4016; G06Q 20/401; G06Q 20/40
See application file for complete search history.

(56) References Cited

U.S. PATENT DOCUMENTS

| | | |
|---|---|---|
| 9,294,497 B1 | 3/2016 | Ben-Or et al. |
| 2003/0147516 A1 | 8/2003 | Lawyer et al. |
| 2015/0073981 A1* | 3/2015 | Adjaoute ........... G06Q 20/4016 705/39 |
| 2016/0004979 A1 | 1/2016 | Getchius |

(Continued)

*Primary Examiner* — Edward Zee
(74) *Attorney, Agent, or Firm* — Eric L. Sophir; Dentons US LLP

(57) ABSTRACT

Disclosed herein are systems and methods executing a security server that perform various processes using alert elements containing various data fields indicating threats of fraud or attempts to penetrate an enterprise network. Using alert elements, the security server generate integrated alerts that are associated with customers of the system and assign a risk score for the integrated alerts, which the security server uses to store and sort the integrated alerts according to a priority, based on the relative risk scores. Analyst computers may query and fetch integrated alerts from an integrate alert database, and then present the integrate alerts to be addressed by an analyst according to the priority level of the respective integrated alerts. This allows to ensure that the right customer, is worked by the right analyst, at the right time, to maximize fraud prevention and minimize customer impact.

20 Claims, 9 Drawing Sheets

(56) References Cited

U.S. PATENT DOCUMENTS

| | | |
|---|---|---|
| 2017/0345006 A1 | 11/2017 | Kohli |
| 2018/0033009 A1 | 2/2018 | Goldman et al. |
| 2018/0253728 A1 | 9/2018 | Hanis et al. |
| 2019/0073647 A1 | 3/2019 | Zoldi et al. |
| 2019/0087821 A1 | 3/2019 | Jia et al. |

* cited by examiner

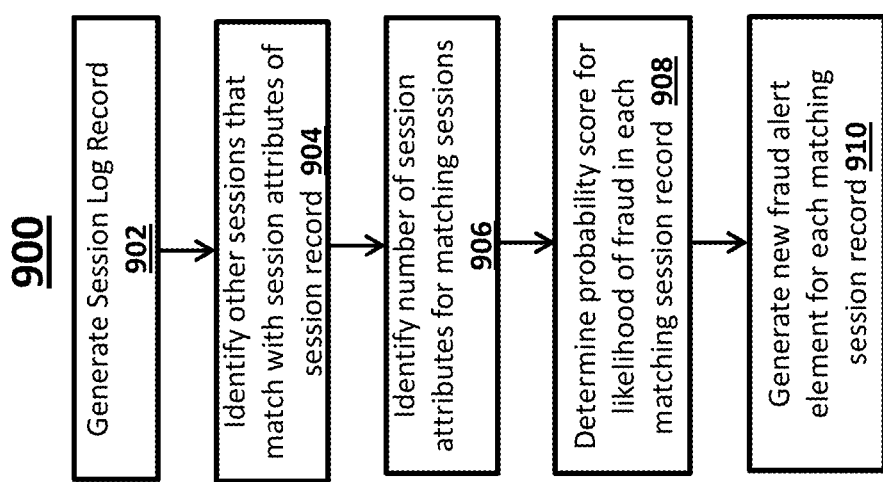

SYSTEMS AND METHODS OF DETECTING AND MITIGATING MALICIOUS NETWORK ACTIVITY

CROSS-REFERENCE TO RELATED APPLICATIONS

This application claims priority to U.S. Provisional Application No. 62/485,124, filed Apr. 13, 2017, which is hereby incorporated by reference in its entirety.

TECHNICAL FIELD

This application relates generally to systems, apparatus, and methods for integrated risk assessment and management by detecting and mitigating malicious network activity.

BACKGROUND

To combat fraud or other malicious behaviors, modern enterprise networks employ a series of multiple reporting devices that indicate potential malicious behavior, through a variety of channels. For example, a webserver hosting an enterprise website may report failed login attempts, while firewalls may report blocked data traffic arriving from untrusted Internet Protocol (IP) addresses. In existing security solutions, the various devices may produce alerts containing potential threat or vulnerability information associated with their respective channels. These alerts are then assigned in a work-queue to an appropriate engineer or fraud analyst who is tasked with addressing the particular alert. In a fraud detection context within a financial institution, these alerts can often be associated with a customer, where fraud analysts can sometimes identify an attack theme, or "scenario," across multiple alerts, provided the alerts arrive in the working-queue in quick succession.

One problem with this basic queuing approach in the conventional technology is managing volume. The sheer volume and growth of alerts presents an operational challenge to detection and analysis of alerts. In many large enterprises, the daily alert volume across all customers can be in the thousands, tens-of-thousands, or hundreds-of-thousands, depending on the size of the enterprise. The volume of alerts generated often exceeds the capacity of the personnel. This results in a significant portion of alerts expiring or not reaching a final disposition of "fraud" or "not fraud." To help ease the burden of volume, existing technology executes fraud detection rules that attempt to assign incoming alerts to one or more scenarios. However, these technological solutions have their own shortcomings, as automated fraud rules become yet another contributor to the volume. The deployment of new fraud rules increases the alert volume or working-queue volume because there is some overlap with existing fraud rules. One fraud rule might assign an alert to one working-queue for a first scenario, while a second fraud rule might assign the same alert to another working-queue for a second scenario. Thus, this automation may help assign alerts to an appropriate queue, but ultimately fail to reduce the overall volume of alerts.

Furthermore, security engineers and fraud analysts often interact with enterprise case management software that logs, monitors, and manages personnel efforts to mitigate alerts. Conventional case management software can tap into working-queues and alerts that are stored into databases that receive and store alerts from, in some cases, multiple alerts were generated in multiple queue for each customer, making it difficult to achieve situational awareness and determine the optimum alert priority to maximize fraud-loss prevention.

Additionally, the sheer volume of alerts also creates a technical problem for the enterprises. Identifying and processing a large volume of alerts requires high processing power. This is highly undesirable because the enterprises have to designate a large portion of their computing infrastructure to processing the alerts, which is inevitably expensive. Furthermore, processing a large number of the alerts, even given today's processing capabilities of the computers, may cause undue delays in the alert determination, which is also highly undesirable because, if not detected in a timely manner, a fraudulent transaction can damage the enterprises' computer infrastructure.

SUMMARY

For the aforementioned reasons, there is a need for an improvement to the fraud detection technology that will reduce the volume of alerts without sacrificing data inputs received from devices through the various alert channels. There is a need a network and computer-specific solution to reduce the time and processing power needed to detect fraudulent transactions.

Disclosed herein are systems and methods capable of addressing the above-described shortcomings and may also provide any number of additional or alternative benefits and advantages. As described herein, embodiments of the present disclosure relate to systems, apparatuses, methods, and computer program products for integrated risk assessment and management by detecting and mitigating malicious network activity and/or fraud indicators to prioritize customers in a fraud detection workflow using a holistic risk score created by consolidating fraud indicators into a single alert. Such systems, apparatuses, methods, and computer program products of the present disclosure maximize fraud loss prevention by using loss driven scoring that learns from evolving fraud trends, increases speed of the fraud detection by dynamically re-evaluating risk as new information becomes available, increases in available capacity by reducing false positives, and provides scalable solution to serve growing membership with existing fraud detection assets.

Systems, apparatuses, methods, and computer program products of the present disclosure execute a security server or any other server of a fraud prevention system that performs various processes using alert elements containing various data fields, indicating threats of fraud or attempts to penetrate an enterprise network, in order to determine whether the alert elements contain attributes matching attributes of one or more scenarios. Using these alert elements, the security server or any other server of the fraud prevention system generate integrated alerts that are associated with clients/customers/users/customers of the system and assign a risk score for the integrated alerts, which the security server or any other server of the fraud detection system uses to store and sort the integrated alerts according to a priority based on their relative risk scores. Analyst computers may query and fetch these integrated alerts from an integrated alert database and then present these integrated alerts to be addressed by an analyst according to the priority level of the respective integrated alerts. This can ensure that the right customer is worked by the right analyst at the right time to maximize fraud prevention, reduce fraud detection analyst resources, and minimize customer impact.

In one embodiment, a computer-implemented method may include receiving, by a computer, a set of one or more alert elements containing a customer identifier from one or more alert-generating systems configured to generate a corresponding alert element. The computer-implemented method may further include generating, by the computer, in an integrated alert database an integrated alert associated with the customer identifier, the integrated alert comprising one or more data fields containing data from the set of one or more alert elements associated with the customer identifier in the alert element database, wherein the integrated alert database is configured to store a plurality of integrated alerts associated with a plurality of customer identifiers. The computer-implemented method may further include generating, by the computer, a first learning algorithm configured to determine a risk associated with each of the set of one or more alert elements, wherein the first learning algorithm receives an input of a first learning algorithm dataset based on data associated with a set of one or more scenario attribute models, wherein each of the set of one or more scenario attribute models is associated with a different rate of fraud. The computer-implemented method may further include iteratively updating, by the computer, the first learning algorithm dataset based on updated data associated with the set of one or more scenario attribute models, wherein the computer periodically queries a database to receive the updated data associated with the set of one or more scenario attribute models. The computer-implemented method may further include executing, by the computer, the first learning algorithm on each integrated alert stored in the integrated alert database to generate a risk score for each respective integrated alert, the risk score of the integrated alert based upon the one or more data fields in the integrated alert. The computer-implemented method may further include, upon the computer receiving a second alert element associated with the customer identifier from an alert-generating system, identifying, by the computer, in the integrated alert database the integrated alert associated with the customer identifier; and updating, by the computer, the risk score for the integrated alert based upon the one or more data fields of the second alert element and the set of one or more alert elements, upon determining that the integrated alert is not marked as completed.

In another embodiment, a fraud prevention system may include one or more alert-generating systems, configured to generate an alert element in an alert element database, configured to store a plurality of alert elements. The fraud prevention system may further include a computer configured to receive a set of one or more alert elements containing a customer identifier from one or more alert-generating systems configured to generate a corresponding alert element. The computer is further configured to generate in an integrated alert database an integrated alert associated with the customer identifier, the integrated alert comprising one or more data fields containing data from the set of one or more alert elements associated with the customer identifier in the alert element database, wherein the integrated alert database is configured to store a plurality of integrated alerts associated with a plurality of customer identifiers. The computer is further configured to generate a first learning algorithm configured to determine a risk associated with each of the set of one or more alert elements, wherein the first learning algorithm receives an input of a first learning algorithm dataset based on data associated with a set of one or more scenario attribute models, wherein each of the set of one or more scenario attribute models is associated with a different rate of fraud. The computer is further configured to iteratively update the first learning algorithm dataset based on updated data associated with the set of one or more scenario attribute models, wherein the computer periodically queries a database to receive the updated data associated with the set of one or more scenario attribute models. The computer is further configured to execute the first learning algorithm on each integrated alert stored in the integrated alert database to generate a risk score for each respective integrated alert, the risk score of the integrated alert based upon the one or more data fields in the integrated alert. The computer is further configured to, upon the computer receiving a second alert element associated with the customer identifier from an alert-generating system, identify in the integrated alert database the integrated alert associated with the customer identifier; and update the risk score for the integrated alert based upon the one or more data fields of the second alert element and the set of one or more alert elements, upon determining that the integrated alert is not marked as completed.

In another embodiment, a computer-implemented method may include receiving, by a computer, a set of one or more alert elements containing a customer identifier from one or more alert-generating systems configured to generate a corresponding alert element. The computer-implemented method may further include storing, by the computer, each alert element into an alert element database configured to store a plurality of alert elements associated with a plurality of customer identifiers. The computer-implemented method may further include generating, by the computer, in an integrated alert database, an integrated alert associated with the customer identifier where the integrated alert may include one or more data fields containing data from the set of one or more alert elements associated with the customer identifier in the alert element database. The integrated alert database may be configured to store a plurality of integrated alerts associated with a plurality of customer identifiers. The computer-implemented method may further include generating, by the computer, a risk score for each respective integrated alert stored in the integrated alert database where the risk score of the integrated alert is based upon the one or more data fields in the integrated alert. The computer-implemented method may further include, upon the computer receiving a second alert element associated with the customer identifier from an alert-generating system, identified by the computer, in the integrated alert database, the integrated alert associated with the customer identifier. The computer-implemented method may further include updating, by the computer, the risk score for the integrated alert based upon the one or more data fields of the second alert element and the set of one or more alert elements upon determining that the integrated alert is not marked as completed.

In another embodiment, a fraud prevention system may include one or more alert-generating systems, configured to generate an alert element in an alert element database, configured to store a plurality of alert elements. The fraud prevention system may further include a computer configured to receive a set of one or more alert elements containing a customer identifier from the one or more alert-generating systems configured to generate a corresponding alert element. The computer is further configured to store each alert element into the alert element database configured to store the plurality of alert elements associated with a plurality of customer identifiers. The computer is further configured to generate an integrated alert associated with the customer identifier in an integrated alert database. The integrated alert may include one or more data fields containing data from the set of one or more alert elements associated with the customer identifier in the alert element database. The integrated alert database may be configured to store a plurality of integrated alerts associated with a plurality of customer identifiers. The computer is further configured to generate a risk score for each respective integrated alert stored in the integrated alert database where the risk score of the integrated alert is based upon the one or more data fields in the integrated alert. The computer is further configured to identify, in the integrated alert database, the integrated alert associated with the customer identifier upon the computer receiving a second alert element associated with the customer identifier from an alert-generating system. The computer is further configured to update the risk score for the integrated alert based upon the one or more data fields of the second alert element and the set of one or more alert elements upon determining that the integrated alert is not marked as completed.

In another embodiment, a computer-implemented method may include receiving, by a computer, a set of one or more alert elements containing a customer identifier from one or more alert-generating systems configured to generate a corresponding alert element. The computer-implemented method may further include storing, by the computer, each alert element into an alert element database configured to store a plurality of alert elements associated with a plurality of customer identifiers. The computer-implemented method may further include generating, by the computer, in an integrated alert database an integrated alert associated with the customer identifier, the integrated alert comprising one or more data fields containing data from the set of one or more alert elements associated with the customer identifier in the alert element database, wherein the integrated alert database is configured to store a plurality of integrated alerts associated with a plurality of customer identifiers. The computer-implemented method may further include executing, by the computer, a first learning algorithm on each respective integrated alert stored in the integrated alert database to generate a risk score for each respective integrated alert, the risk score of the integrated alert based upon the one or more data fields in the integrated alert. The computer-implemented method may further include generating, by the computer, a second learning algorithm configured to identify a particular type of threat associated with each respective integrated alert, wherein the second learning algorithm receives an input of a second learning algorithm dataset based on data associated with a set of model attributes indicating a potential fraud scenario. The computer-implemented method may further include iteratively updating, by the computer, the second learning algorithm dataset based on updated data associated with the set of model attributes, wherein the computer periodically queries a database to receive the updated data associated with the set of model attributes. The computer-implemented method may further include executing, by the computer, the second learning algorithm to identify the particular type of threat for the integrated alert for each respective integrated alert, wherein each integrated alert is stored into a sub-database of the integrated database according to the potential fraud scenario, and sorted according to the relative risk score within the sub-database. The computer-implemented method may further include transmitting, by the computer, a prioritized integrated alert to an analyst computer associated with a set of analyst credentials with rights to access the sub-database containing the prioritized integrated alert, whereby the analyst computer is configured to evaluate the prioritized integrated alert and deny one or more transactions associated with the customer identifier.

In another embodiment, a fraud prevention system may include one or more alert-generating systems configured to generate an alert element and an alert element database configured to store a plurality of alert elements. The system may further include a computer configured to receive a set of one or more alert elements containing a customer identifier from one or more alert-generating systems configured to generate a corresponding alert element. The computer is further configured to store each alert element into an alert element database configured to store a plurality of alert elements associated with a plurality of customer identifiers. The computer is further configured to generate in an integrated alert database an integrated alert associated with the customer identifier, the integrated alert comprising one or more data fields containing data from the set of one or more alert elements associated with the customer identifier in the alert element database, wherein the integrated alert database is configured to store a plurality of integrated alerts associated with a plurality of customer identifiers. The computer is further configured to execute a first learning algorithm on each respective integrated alert stored in the integrated alert database to generate a risk score for each respective integrated alert, the risk score of the integrated alert based upon the one or more data fields in the integrated alert. The computer is further configured to generate a second learning algorithm configured to identify a particular type of threat associated with each respective integrated alert, wherein the second learning algorithm receives an input of a second learning algorithm dataset based on data associated with a set of model attributes indicating a potential fraud scenario. The computer is further configured to iteratively update the second learning algorithm dataset based on updated data associated with the set of model attributes, wherein the computer periodically queries a database to receive the updated data associated with the set of model attributes. The computer is further configured to execute the second learning algorithm to identify the particular type of threat for the integrated alert for each respective integrated alert, wherein each integrated alert is stored into a sub-database of the integrated database according to the potential fraud scenario, and sorted according to the relative risk score within the sub-database. The computer is further configured to transmit a prioritized integrated alert to an analyst computer associated with a set of analyst credentials with rights to access the sub-database containing the prioritized integrated alert, whereby the analyst computer is configured to evaluate the prioritized integrated alert and deny one or more transactions associated with the customer identifier.

In another embodiment, a computer-implemented method may include receiving, by a computer, a set of one or more alert elements containing a customer identifier from one or more alert-generating systems configured to generate a corresponding alert element. The computer-implemented method may further include storing, by the computer, each alert element into an alert element database configured to store a plurality of alert elements associated with a plurality of customer identifiers. The computer-implemented method may further include generating, by the computer, an integrated alert associated with the customer identifier in an integrated alert database. The integrated alert may include one or more data fields containing data from the set of one or more alert elements associated with the customer identifier in the alert element database. The integrated alert database may be configured to store a plurality of integrated alerts associated with a plurality of customer identifiers. The computer-implemented method may further include generating, by the computer, a risk score for each respective integrated alert stored in the integrated alert database where the risk score of the integrated alert is based upon the one or more data fields in the integrated alert. The computer-implemented method may further include identifying, by the computer, a type of threat for the integrated alert for each respective integrated alert based upon a set of model attributes indicating a potential fraud scenario where each integrated alert is stored into a sub-database of the integrated database according to the most likely related fraud scenario and sorted according to the relative risk score within the sub-database. The computer-implemented method may further include transmitting, by the computer, a prioritized integrated alert to an analyst computer associated with a set of analyst credentials with rights to access the sub-database containing the prioritized integrated alert, whereby the analyst computer is configured to evaluate the prioritized integrated alert and deny one or more transactions associated with the customer identifier.

In another embodiment, a fraud prevention system may include one or more alert-generating systems configured to generate an alert element and an alert element database configured to store a plurality of alert elements. The system may further include a computer configured to receive a set of one or more alert elements containing a customer identifier from the one or more alert-generating systems configured to generate a corresponding alert element. The computer is further configured to store each alert element into the alert element database configured to store the plurality of alert elements associated with a plurality of customer identifiers. The computer is further configured to generate an integrated alert associated with the customer identifier in an integrated alert database. The integrated alert may include one or more data fields containing data from the set of one or more alert elements associated with the customer identifier in the alert element database. The integrated alert database may be configured to store a plurality of integrated alerts associated with a plurality of customer identifiers. The computer is further configured to generate a risk score for each respective integrated alert stored in the integrated alert database where the risk score of the integrated alert is based upon the one or more data fields in the integrated alert. The computer is further configured to identify a type of threat for the integrated alert for each respective integrated alert based upon a set of model attributes indicating a potential fraud scenario where each integrated alert is stored into a sub-database of the integrated database according to the potential fraud scenario and sorted according to the relative risk score within the sub-database. The computer is further configured to transmit a prioritized integrated alert to an analyst computer associated with a set of analyst credentials with rights to access the sub-database containing the prioritized integrated alert, whereby the analyst computer is configured to evaluate the prioritized integrated alert and deny one or more transactions associated with the customer identifier.

In another embodiment, a computer-implemented method may include generating, by a computer, a session record for a web-based interaction between a client computer and a webserver. The session record may include one or more session attributes comprising a pattern for uniquely identifying the client computer. The computer-implemented method may further include identifying, by the computer, in an integrated database, an integrated alert having a data field containing the device identification pattern and having a data field indicating that the integrated alert was associated with fraud. The integrated database may contain a plurality of integrated alerts associated respectively with a plurality of customer identifiers. The computer-implemented method may further include identifying, by the computer, one or more session records of one or more clients having session attributes matching with one or more session attributes of the session record. The computer-implemented method may further include generating, by the computer, a session attribute model identifying a number of session attributes of the one or more session records of one or more clients matching with the one or more session attributes of the session record. The computer-implemented method may further include determining, by the computer, a total number of clients from the one or more clients across the one or more session records that matches with the one or more session attributes of the session record. The computer-implemented method may further include determining, by the computer, whether the number of session attributes of the one or more session records of the one or more clients that matches with the one or more session attributes of the session record is in a whitelist upon the computer determining that the total number of clients from the one or more clients across the one or more session records that matches with the one or more session attributes of the session record is greater than a predetermined threshold. The computer-implemented method may further include updating, by the computer, the whitelist by adding the number of session attributes of the one or more session records of one or more clients that matches with the one or more session attributes of the session record into the whitelist upon the computer determining that the number of session attributes of the one or more session records of one or more clients that matches with the one or more session attributes of the session record is not in the whitelist, whereby the whitelist is used to evaluate and permit one or more transactions associated with the device identifier.

In another embodiment, a fraud prevention system may include a client computer, a webserver, and an integrated database containing a plurality of integrated alerts associated respectively with a plurality of customer identifiers. The computer is configured to generate a session record for a web-based interaction between the client computer and the webserver. The session record may include one or more session attributes comprising a pattern for uniquely identifying the client computer. The computer is further configured to identify in the integrated database an integrated alert having a data field containing the device identifier and having a data field indicating that the integrated alert was associated with fraud. The computer is further configured to identify one or more session records of one or more clients having session attributes matching with the one or more session attributes of the session record. The computer is further configured to generate a session attribute model identifying a number of session attributes of the one or more session records of one or more clients matching with the one or more session attributes of the session record. The computer is further configured to determine a total number of clients from the one or more clients across the one or more session records that match with the one or more session attributes of the session record. The computer is further configured to determine whether the number of session attributes of the one or more session records of the one or more clients that matches with the one or more session attributes of the session record is in a whitelist upon the computer determining that the total number of clients from the one or more clients across the one or more session records that matches with the one or more session attributes of the session record is greater than a predetermined threshold. The computer is further configured to update the whitelist by adding the number of session attributes of the one or more session records of one or more clients that matches with the one or more session attributes of the session record into the whitelist upon the computer determining that the number of session attributes of the one or more session records of one or more clients that matches with the one or more session attributes of the session record is not in the whitelist, whereby the whitelist is used to evaluate and permit one or more transactions associated with the device identifier.

In another embodiment, a computer-implemented method may include receiving, by a computer, a record of a fraudulent transaction associated with a client from a system database. The computer-implemented method may further include determining, by the computer, one or more attributes corresponding to the fraudulent transaction associated with the client. The computer-implemented method may further include tagging, by the computer, attributes in all transactions that match with the one or more attributes corresponding to the fraudulent transaction associated with the client. The computer-implemented method may further include identifying, by the computer, a session record comprising one or more session attributes that match the tagged attributes corresponding to the fraudulent transaction associated with the client session record. The session record may be a web-based interaction between a client computer and a webserver. The one or more session attributes comprising a pattern for uniquely identifying the client computer. The computer-implemented method may further include identifying, by the computer, one or more session records associated with one or more clients having session attributes matching with the one or more session attributes of the session record. Upon the computer identifying that the one or more session records associated with the one or more clients have the session attributes matching with the one or more session attributes of the session record, the computer-implemented method may further include determining, by the computer, a total number of clients from the one or more clients across the one or more session records that are unique. The computer-implemented method may further include generating, by the computer, new fraud alerts elements for each of the unique clients, whereby the new fraud alert elements are used to deny one or more transactions associated with each of the unique clients.

In another embodiment, a fraud prevention system may include a client computer, a webserver, a system database containing records of fraudulent transactions associated with clients, and a computer. The computer is configured to receive a record of a fraudulent transaction associated with a client from the system database. The computer is further configured to determine one or more attributes corresponding to the fraudulent transaction associated with the client. The computer is further configured to tag attributes in all transactions that matches with the one or more attributes corresponding to the fraudulent transaction associated with the client. The computer is further configured to identify a session record comprising one or more session attributes that match the tagged attributes corresponding to the fraudulent transaction associated with the client. The session record is a web-based interaction between the client computer and the webserver. The one or more session attributes comprising a pattern for uniquely identifying the client computer. The computer is further configured to identify one or more session records associated with one or more clients having session attributes matching with the one or more session attributes of the session record. The computer is further configured to, upon the computer identifying that the one or more session records associated with the one or more clients have the session attributes matching with the one or more session attributes of the session record, determine a total number of clients from the one or more clients across the one or more session records that are unique. The computer is further configured to generate new fraud alerts elements for each of the unique clients, whereby the new fraud alert elements are used to deny one or more transactions associated with each of the unique clients.

In another embodiment, a computer-implemented method may include generating, by a computer, a session record for a web-based interaction between a client computer and a webserver. The session record may include one or more session attributes comprising at least a device identifier uniquely identifying the client computer. The computer-implemented method may further include identifying, by the computer, in an integrated database an integrated alert having a data field containing the device identifier and having a data field indicating that the integrated alert was associated with fraud. The integrated database may contain a plurality of integrated alerts associated respectively with a plurality of customer identifiers. The computer-implemented method may further include tagging, by the computer, the session record having the one or more session attributes upon the computer identifying the integrated alert containing the device identifier. The computer-implemented method may further include identifying, by the computer, one or more session records of one or more clients having session attributes matching with the one or more session attributes of the tagged session record using the one or more session attributes from the tagged session record.

In another embodiment, a fraud prevention system may include a client computer, a webserver, and an integrated database containing a plurality of integrated alerts associated respectively with a plurality of customer identifiers. The system may further include a computer configured to generate a session record for a web-based interaction between the client computer and the webserver. The session record may include one or more session attributes comprising at least a device identifier uniquely identifying the client computer. The system may further include a computer configured to identify in the integrated database an integrated alert having a data field containing the device identification pattern and having a data field indicating that the integrated alert was associated with fraud. The system may further include a computer configured to tag the session record having the one or more session attributes upon the computer identifying the integrated alert containing the device identification pattern. The system may further include a computer configured to identify one or more session records of one or more clients having session attributes matching with the one or more session attributes of the tagged session record using the one or more session attributes from the tagged session record.

In another embodiment, a computer-implemented method may include generating, by a computer, a session record for a web-based interaction between a client computer and a webserver. The session record may include one or more session attributes comprising a pattern for uniquely identifying the client computer. The computer-implemented method may further include identifying, by the computer, one or more session records of one or more clients having session attributes matching with the one or more session attributes of the session record. The computer-implemented method may further include identifying, by the computer, a number of session attributes for each of the one or more session records of the one or more clients matching with the one or more session attributes of the session record. The computer-implemented method may further include determining, by the computer, a threshold value for each of the number of session attributes of the one or more session records of the one or more clients that matches with the one or more session attributes of the session record based on pre-defined threshold criteria. The computer-implemented method may further include determining, by the computer, a probability score for likelihood of fraud in each of the one or more session records based on the threshold value for each of the number of session attributes of the one or more session records that matches with the one or more session attributes of the session record. The computer-implemented method may further include generating, by the computer, a new fraud alert element for clients of each of the one or more session records based on the probability score for the likelihood of fraud in each of the one or more session records, whereby the new fraud alert element is used to deny one or more transactions associated with each clients.

In another embodiment, a fraud prevention system may include a client computer, a webserver, and a computer. The computer is configured to generate a session record for a web-based interaction between the client computer and the webserver. The session record may include one or more session attributes comprising a pattern for uniquely identifying the client computer. The computer may further be configured to identify one or more session records of one or more clients having session attributes matching with the one or more session attributes of the session record. The computer may further be configured to identify a number of session attributes for each of the one or more session records of the one or more clients matching with the one or more session attributes of the session record. The computer may further be configured to determine a threshold value for each of the number of session attributes of the one or more session records of the one or more clients that matches with the one or more session attributes of the session record based on pre-defined threshold criteria. The computer may further be configured to determine a probability score for likelihood of a fraud in each of the one or more session records based on the threshold value for each of the number of session attributes of the one or more session records that matches with the one or more session attributes of the session record. The computer may further be configured to generate new fraud alert element for client of each of the one or more session records based on the probability score for the likelihood of fraud in each of the one or more session records, whereby the new fraud alert element is used to deny one or more transactions associated with each clients.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments that, together with the specification, explain the subject matter.

FIG. 9 shows execution of a method to assess likelihood of fraud in each session using associated attribute thresholds, according to an exemplary embodiment.

DETAILED DESCRIPTION

Figure 1:
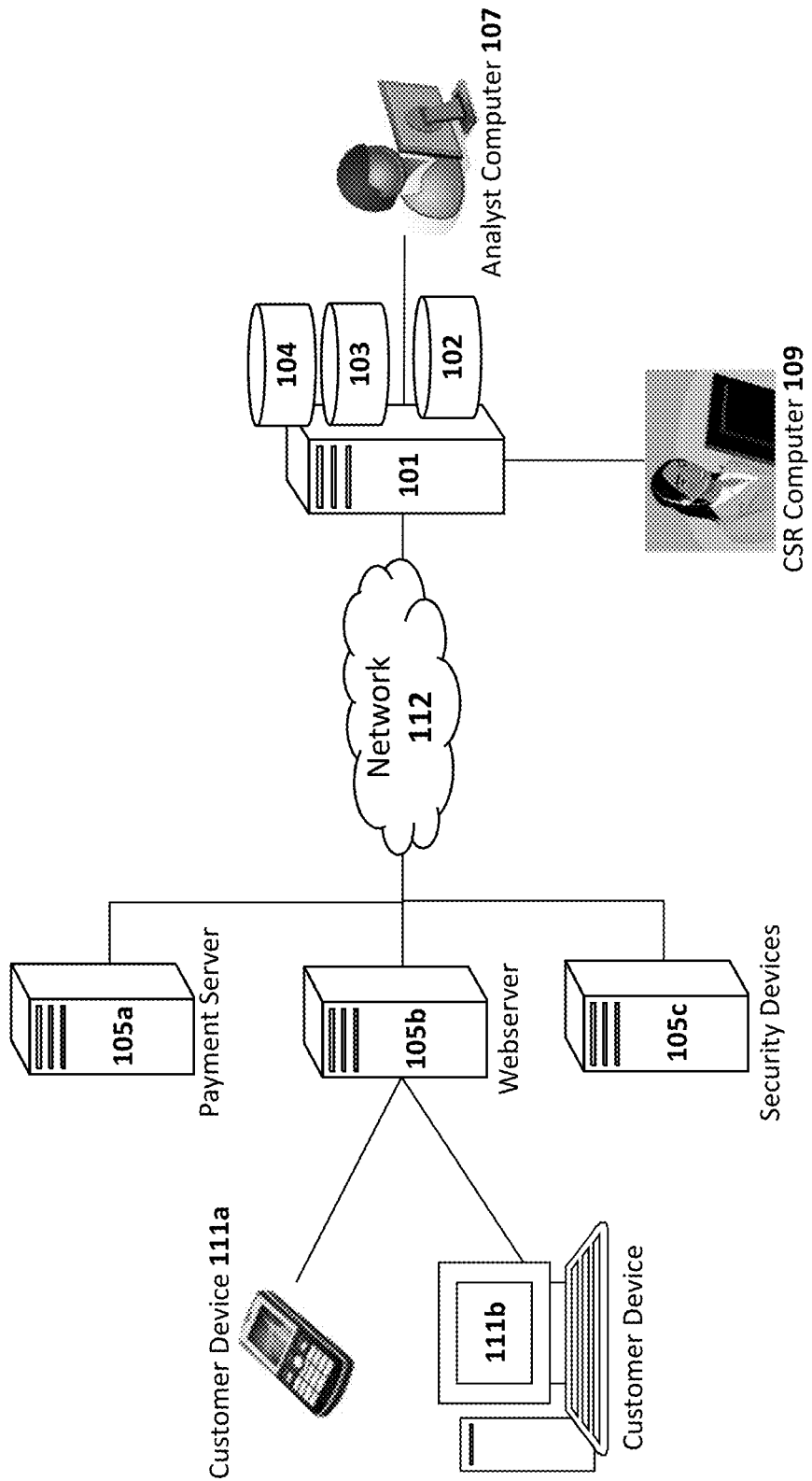
FIG. 1 shows components of a fraud prevention system, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 shows components of a fraud prevention system 100, according to an exemplary embodiment. The fraud prevention system 100 may include security servers 101, a system database 102, alert element databases 103, integrated alert databases 104, alert-generating systems 105, analyst computers 107, customer service representative (CSR) computers 109, and customer devices 111. The security servers 101, the system database 102, the alert element databases 103, the integrated alert databases 104, the alert-generating systems 105, the analyst computers 107, the customer service representative (CSR) computers 109, and the customer devices 111 are connected to each other through a network 112. The examples of the network 112 may include, but are not limited to, private or public LAN, WLAN, MAN, WAN, and the Internet. The network 112 may include both wired and wireless communications according to one or more standards and/or via one or more transport mediums. The communication over the network 112 may be performed in accordance with various communication protocols such as Transmission Control Protocol and Internet Protocol (TCP/IP), User Datagram Protocol (UDP), and IEEE communication protocols. In one example, the network 112 may include wireless communications according to Bluetooth specification sets, or another standard or proprietary wireless communication protocol. In another example, the network 112 may also include communications over a cellular network, including, e.g. a GSM (Global System for Mobile Communications), CDMA (Code Division Multiple Access), EDGE (Enhanced Data for Global Evolution) network.

In operation, alert-generating systems 105 may generate alert elements containing various data fields indicating threats of fraud or attempts to penetrate an enterprise network 112, and indicating one or more particular customers of the system 100 associated with an alert element (often the target of a type of fraud). Hereinafter, the term "customers," "clients," "customers," and "users" may be interchangeably used. The alert elements may be stored into an alert element database 103 to await further processing. A security server 101 may perform various processes using the alert elements, such as determining whether the alert elements contain attributes matching attributes of one or more scenarios. Using the alert elements stored in the alert element database 103, the security server 101 may then generate integrated alerts that are associated with the customers of the system 100, and then store the integrated alerts into an integrated alert database 104. The security server 101 may generate a risk score for the integrated alerts, which the security server 101 uses to store and sort the integrated alerts according to a priority, based on the relative risk scores. Analyst computers 107 may query and fetch integrated alerts from the integrated alert database 104, and then present the integrate alerts to be addressed by an analyst according to the priority level of the respective integrated alerts. Periodically or in response to triggering condition, the security server 101 may update the risk scores of the integrated alerts in the integrate alert database 104 as more alert elements are received from the alert-generating systems 105. In response, the analyst queue may be adjusted to reflect the updated risk scores of the integrated alerts in the integrated alert database 104. Analyst computers 107 may then be configured to execute one or more instructions on the respective integrated alerts based on the priority level of the respective integrated alerts and/or the updated priority level of the integrated alerts based on updated risk scores of the integrated alerts in the integrated alert database 104. The one or more instructions are configured to initiate processing of the various data fields corresponding to the integrated alerts indicating threats of fraud or attempts, and depending on results of the processing of the data fields, the analyst computers 107 may then cause to terminate an account and/or a transaction of the customer associated with the integrated alert.

In some implementations, the analyst computer 107 may generate an analyst queue model that includes queues that each contains one or more integrated alerts. The queues may be populated from the integrated alerts stored in the integrate alert database 104 received from an automated system 100 having the alert-generating systems 105 that are operable to track, monitor, and flag for potentially fraudulent activity. Each queue generated by the analyst computer 107 contains the integrated alerts of a certain risk level from various customers. A risk-level may be determined by computing devices of the automated system 100 based on how likely fraudulent activity associated with the integrated alert is to have occurred and/or the frequency of potentially fraudulent activity associated with the integrated alert for a particular customer. In yet another alternative embodiment, a queue may contain the integrated alerts based on other attributes, such as the customer information and/or the potentially fraudulent activity.

Security servers 101 may be any computing device comprising a processor and non-transitory machine-readable storage medium and capable of performing the various tasks and processes described herein during execution. Non-limiting examples of the security server 101 may include a desktop computer, a server computer, a laptop computer, a tablet computer, and the like. For ease of explanation, FIG. 1 shows a single computing device functioning as the security server 101. However, it should be appreciated that some embodiments may comprise any number of computing devices capable of performing the various tasks described herein.

A security server 101 may receive alert elements from various types of alert-generating systems 105 or a CSR computer 109. The alert elements may be log files or other machine-readable code containing various data fields describing a detected event associated with the data channel. For instance, a webserver 105b may require users to authenticate as valid, recognized customers of the enterprise system 100. The webserver 105b may generate an authentication-failure alert element upon receiving improper authentication credentials from a customer device 111. The data fields of an authentication-failure alert element may contain data fields associated with the detected event, such as data fields describing the source device and data fields describing the particular customer account the user was attempting to access. Upon receiving the alert elements, the security server 101 or any other server of the system 100 may associate the alert elements with a customer account based on the data fields of the alert elements. The alert elements may, for example, contain a data field indicating a customer identifier value that is unique to the customer. The security server 101 may store the alert elements into an alert-element database 103. Simultaneously or at some other time, the security server 101 may generate or update an integrated alert for the customer identifier, where the integrated alert is a log file or any other machine-readable code containing data fields that are populated with data that is based on the alert elements associated with the alert elements associated with the same customer identifier. Regardless of the number of alert elements received for a customer identifier from the alert-generating systems 105 or CSR computers 109, the integrated alert database 104 contains only a single integrated alert for the particular customer identifier.

A security server 101 may be coupled to one or more alert-generating systems 105 via one or more internal or external networks 112. The security server 101 may execute various processes on incoming alert elements received from the alert-generating systems 105, such as data field formatting, identifying an associated customer, or determining a particular scenario having attributes matched to the alert element. In some implementations, the security server 101 may comprise a set of one or more scenario attribute models that may indicate to the security server 101 whether a particular type of fraud or attack is potentially detected or ongoing. Scenario models may be computer files stored on the security server 101 or separate database device, such as a system database 102, and comprise a set of alert element attributes that indicate a type of scenario of potential fraud or attack. In such implementations, the security server 101 may identify data field entries in the incoming alert elements to identify one or more matches to corresponding attributes in the scenario models. In some cases, the security server 101 may generate or update an integrated alert upon receiving and identifying that an alert element matches a particular scenario. To tailor which alert elements or types of alert elements trigger the security server 101 processing, the security server 101 may dismiss or otherwise delete an alert element from the alert element database 103 when the security server 101 does not identify a scenario having attributes that capture a threshold number of data fields in the alert element.

A security server 101 may determine a risk score for each integrated alert stored in an integrated alert database 104. The risk score of an integrate alert is based on an algorithm that the security server 101, or any other server of the system 100, applies to the data fields of the alert elements underlying the particular integrated alert. The security server 101 may determine a risk score for each integrated alert based on an algorithm such as a non-linear statistical data model that calculates the risk score associated with the fraud or attack. Such non-linear statistical data models may include neural networks, decision trees, Bayesian networks, genetic algorithms, and several other types of non-linear statistical data models. The non-linear statistical data model used by the security server 101 may be a neural network. Neural networks have numerous applications, such as being used to determine customers' credit scores based on information about the customers, such as number of credit cards, late payments, income, etc.

A security server 101 may determine a risk score for each integrated alert based at least on a fraud probability score, potential loss, sequence score, and save-loss ratio of the data fields of the alert elements underlying the particular integrated alert. For instance, when the data fields of the alert elements underlying the particular integrated alert correspond to the remote network logon logs of the customer for suspicious access attempts, the security server 101 may apply a fraud probability score based rule to review and flag that particular integrated alert as non-suspicious after having determined that the customer is legitimately logging in from a different geographic location. The security server 101 can learn the customer's behavior over time and ultimately score this event with a much lower risk score compared with a customer who does not travel. The security server 101 may also be able to compare the different geographic regions. For example, a customer who is known to travel occasionally to France may still generate a higher-level risk score when an access is attempted from a geographic zone that may not have been previously associated with the customer.

The security server 101 may determine a fraud probability score based on scenarios applied to the data fields of the alert elements underlying the particular integrated alert. In one example scenario, when the webserver 105b determines that a user fails multiple times to authenticate himself or herself as valid and recognized customer of the enterprise system 100, the security server 101 may determine a probability of fraud (e.g., 25% probability) based on historical data. In another example scenario, when the webserver 105b determines that a user authenticate as a valid, recognized customer of the enterprise system after multiple attempts, and there is a suspicious deposit in the account that the user accessed after multiple login attempts, the security server 101 may determine a higher probability of fraud (for example, 60% probability) based on the historical data, because there were two events that occurred together (multiple attempt authentication and suspicious deposit event). The security server 101 may then use the values of the fraud probability score of the data fields of the alert elements underlying the particular integrated alert to calculate the risk score of the particular integrate alert.

In some embodiments, the security server 101 may initially determine a fraud probability score in order to calculate a risk score of an integrated alert. Based on the value of the fraud probability score, the security server 101 may then determine potential loss that is also used to calculate the risk score of the integrate alert. In one instance, the security server 101 may determine potential loss based on value of the fraud probability score such that the value of the potential loss is proportional to the value of the fraud probability score. As an example, a higher value of the fraud probability score may correspond to a higher value of the potential loss. In another instance, the security server 101 may determine the potential loss based on a financial data of the customer. For example, the security server 101 may determine total financial assets of the customer stored in the system database 102. The total assets of the customer may include available credit through consumer lending, credit cards, home equity lines of credit, mutual funds, brokerage accounts, and other financial data available for the customer. The security server 101 may then analyze the financial data of the customer to determine the potential loss where the probability of potential loss becomes higher when the customer has substantial financial assets and money since a fraudster may get the money out from the customer financial accounts. The security server 101 may then use the values of the fraud probability score and the potential loss to calculate the risk score of the integrate alert.

The security server 101 may also determine a sequence score based on the data fields of the alert elements underlying a particular integrated alert in order to calculate the risk score of the particular integrate alert. The security server 101 may calculate the sequence score based on different scenarios associated with the alert elements underlying the particular integrated alert. The security server 101 may initially identify integrated alerts for customers that have multiple scenarios that trigger for the integrated alerts. Upon the identification of the integrated alerts for customers that have multiple scenarios that trigger for the integrated alerts, the security server 101 may then identity the timestamps between all those integrated alerts and calculate the difference between the timestamps all those integrated alerts. Using these difference values between the timestamps, the security server 101 may then determine that a particular integrated alert is generated prior to or after other integrated alerts. The security server 101 may then use these difference values between the timestamps to determine a sequence score for this particular integrated alert. The security server 101 may determine a sequence score for this particular integrated alert between a predetermine range. For example, the security server 101 may determine the sequence score between a negative three and a positive three.

In some embodiments, the security server 101 may use a brute force technique for calculating the difference values between the timestamps across all possible scenario combinations that generated the alert elements underlying the particular integrated alert, such as an authentication-related scenario and a fraudulent deposit related scenario. In an example, the security server 101 may initially perform pairing of alert elements among all alert elements underlying a particular integrated alert. For example, the security server 101 may identify any two alert elements, such as alert A and alert B, among all alert elements underlying the particular integrated alert. Alert A and alert B are differenced in the time stamps where alert A occurred a few hours (e.g., 6 hours) before alert B. The security server 101 may then identify a time scenario alert A was generated, and then the security server 101 may determine data associated with alert A and compare it to all the other scenarios to generate a summary statistics having a sequence score corresponding to alert A. In the summary statistics, if the security server 101 determines that a given scenario for alert A has a negative value number, the alert A on average may be occurring before all the other alert elements, and if the alert A has a positive value number, alert A may be occurring after the other alert elements. The security server 101 may then use the value of sequence score along with the values of the fraud probability score and the potential loss in order to calculate the risk score of this particular integrated alert. In one embodiment, when the security server 101 determines a high value sequence score for the particular integrate alert, the security server 101 may offset the low fraud probability score determined for the particular integrate alert in order to calculate the risk score of this particular integrate alert. In another embodiment, when the security server 101 determines a high value sequence score for the particular integrate alert, the security server 101 may not offset the low fraud probability score determined for the particular integrate alert in order to calculate the risk score of this particular integrate alert.

The security server 101 may also determine a save-loss score based on the data fields of the alert elements underlying a particular integrated alert in order to calculate the risk score of the particular integrate alert. The security server 101 may calculate the save-loss score based on financial information/data of the customer. For instance, the security server 101 upon determining that a fraud alert event has occurred where the money is lost from the customer account, based on financial information of the customer, the security server 101 may determine an amount of money lost, an amount of money recovered by recovery agents, and an amount of money prevented from being lost. Upon the determination of the amount of money lost, the amount of money recovered, and the amount of money prevented from being lost, the security server 101 may then determine a save-loss score, which is a ratio of outcome of action to outcome of inaction where the outcome of action means that the security server 101 addressed the fraud alert event and outcome of the inaction means that the security server 101 did not addressed the fraud alert event. Based on a ratio of the outcome of action to the outcome of inaction, the security server 101 may determine scenarios associated with the fraud alert event where there are relatively high recovery amounts and high prevented amounts in a relationship to the loss. The security server 101 may then use the value of saved-loss score along with the values of the sequence score, the fraud probability score, and the potential loss to calculate the risk score of this particular integrated alert. In an alternative embodiment, the save-loss value may be determined by calculating a ratio of outcome of inaction to outcome of action. The ratio of the outcome of inaction to the outcome of action may be equal to the ratio of a sum of an amount of money lost and an amount of money recovered and an amount of money prevented from being lost to an amount of money lost.

In some embodiment, a risk score for each integrated alert determined based at least on a fraud probability score, a potential loss, a sequence score, and a save-loss ratio and stored in an integrated alert database 104 can be expressed as a percentage, with higher percentages indicating higher risk. In some cases, a security server 101 may generate or update the risk score for each integrated alert at a predetermined interval (e.g., every 5 minutes); and, in some cases, the security server 101 may generate or update the risk score for each integrated alert in response to a triggering event, such as receiving a new alert element for the customer identifier of the integrated alert or when a threshold number of alert elements have been received for a customer identifier. The security server 101 or a server hosting the integrated alert database 104 may sort the integrated alerts according to the risk score, such that the integrated alerts may be presented on a graphical user interface (GUI) of an analyst computer 107 in order of priority as indicated by the relative risk scores.

A security server 101 may identify a type of threat for an integrated alert based upon a set of model attributes indicating a potential fraud scenario. The type of threat identified and each of the integrated alerts is then stored into a sub-database of the integrated database 104 according to the potential fraud scenario and sorted according to the relative risk score within the sub-database. In some embodiments, the security server 101 or a server hosting the sub-database of the integrated alert database 104 may update the risk score of the integrated alert based on the type of threat and then sort the integrated alerts according to the updated risk score, such that the integrated alerts may be presented on a graphical user interface (GUI) of the analyst computer 107 in order of priority as indicated by the updated relative risk scores. For instance, the security server 101 may identify a risk threat associated with the integrated alert based on its underlying alert elements to be a regulatory risk. In such a case, the security server 101 will then identify rules related to the regulatory risk from a system database 102. As an example, the security server 101 may determine that the integrated alerts associated with the regulatory risk may have to be addressed within a fixed time period (e.g., 72 hours). In such instance, the security server 101 may start a timer on the integrated alerts associated with the regulatory risk, and when the waiting time spent to address the integrated alerts associated with the regulatory risk approaches the fixed time period (e.g., 72 hours), the security server 101 may move the integrated alerts associated with the regulatory risk into a scenario that has higher priorities. In other words, although the integrated alert associated with a regulatory risk may have lower risk financially, the security server 101 has to prioritize the addressing of the integrated alert associated with a regulatory risk in order to deal with the rules associated with the regulatory risk.

In another instance, upon receiving an application for a loan from a customer, the security server 101 may apply fraud rules stored in a system database 102 to the loan application request of the customer for background verification of the customer. Upon determining that the customer and/or data in the customer application is suspicious based on the application of the fraud rules, the security server 101 will pause the processing of the loan application of the customer and subsequently determine other internal rules regarding the loan application suspicion risk. As an example, the security server 101 may determine that the integrated alerts generated based on the loan application suspicion risk have to be addressed within a fixed period of time (e.g., 24 hours) as the customer may potentially become a new client. In such instance, the security server 101 may start a timer on this integrated alert associated with the loan application suspicion risk, and when waiting time spent to address this integrated alert associated with the loan application suspicion risk start getting close to their fixed time period (e.g., 24 hours), the security server 101 moves this integrated alert into a scenario that has higher priorities. Although this integrated alert associated with a loan application suspicion risk may not be a fraud event, the security server 101 has to prioritize this integrated alert associated with a loan application suspicion risk in order to deal with the rules associated with application submitted by new customer rules. After prioritizing the integrated alerts based on the scenarios as discussed above, the security server 101 may then transmit a prioritized integrated alert to the analyst computer 107 associated with the set of analyst credentials with rights to access the sub-database containing the prioritized integrated alert.

A security server 101 may generate a session record for a web-based interaction between a client computer/customer device 111 and a webserver 105b. The session record may comprise one or more session attributes containing data fields related to the interaction, such as a session identifier, a timestamp, a customer identifier, and source device identifier information uniquely identifying the customer device 111 (e.g., IP address, MAC address). The security server 101 may capture data for the session between the customer device 111 and the webserver 105b at different times of the interactions, such as capturing source device information from header portions of IP packets or customer identifier information from an authentication attempt. In some instances, a session may transition between channels. For example, a session may begin when a user accesses the website and is properly authenticated as a customer. In some embodiments, the security server 101 may gather the session record that may contain data gathered through the web-based interactions from the customer device 111 and the telephone-based interaction from the CSR computer 109 and/or IVR system. The security server 101 may then store the session records gathered by the security server 101 locally or in a database hosted on any server within the network 112.

In some embodiments, after the generation of the session record comprising source device identifier information, the security server 101 may then identify an integrated alert having a data field containing the device identifier information uniquely identifying the customer device 111 in the integrated alert database 104 obtained from the session record. The integrated alert may have a data field indicating that the integrated alert was associated with fraud. The security server 101 may further identify one or more other session records of one or more other clients having session attributes matching with the one or more session attributes of the session record containing the device identifier information uniquely identifying the customer device 111. The security server 101 then generates a session attribute model. The session attribute model may identify a number of session attributes of the one or more other session records of the one or more other clients matching with the one or more session attributes of the session record. Based on the session attribute model, the security server 101 may then determine a total number of clients from the one or more other clients across the one or more other session records that match with the one or more session attributes of the session record. The security server 101 may then determine whether the total number of clients from the one or more other clients across the one or more session records that matches with the one or more session attributes of the session record is greater than a predetermined threshold number. Upon the determination that the total number of clients from the one or more other clients across the one or more session records that matches with the one or more session attributes of the session record is greater than a predetermined threshold number, the security server 101 may then determine whether the number of session attributes of the one or more session records of the one or more other clients that matches with the one or more session attributes of the session record is in a whitelist record. Alternatively, upon the security server 101 determining that the number of session attributes of the one or more session records of one or more other clients that matches with the one or more session attributes of the session record are not in the whitelist record, the security server 101 updates the whitelist by adding the number of session attributes of the one or more session records of one or more clients that matches with the one or more session attributes of the session record into the whitelist record.

The integrated alert database 104 or a separate database may include a whitelist record and a blacklist record. The security server 101 may generate whitelist records and blacklist records based on classification of an incoming query and store in the integrated alert database 104. The query is classified based on an IP address and/or device ID, which may be performed in numerous ways. For example, an IP address and device ID pair associated with known registered client/customer can be whitelisted (e.g., identified in the whitelist record). The query can be classified by consulting a record of previous classifications made to queries with the same IP address and device ID. The whitelist record may include a list of authorized IP addresses (an attribute of a session record), and the blacklist record may include a list of un-authorized IP addresses. The set of one or more acceptable and authorized IP addresses of the whitelist record are predetermined to satisfy the safety acceptability threshold required by the system 100. During operation, in order to verify a unique IP address (a session attribute) from the one or more session records of one or more other clients that matches with the one or more session attributes of the session record, the security server 101 may first query the whitelist record hosted by the integrated alert database 104 or a separate database of the system 100. Upon determining that the inputted IP address is present in the whitelist, the security server 101 may automatically forge determination of creditability of the unique IP address that is matched to an acceptable IP address in the whitelist record.

A security server 101 may be configured to receive a record of a fraudulent transaction associated with a client from a system database 102. The system database 102 may transmit the record of the fraudulent transaction associated with the client to the security server 101 on receiving a request from the security server 101. Alternatively, the system database 102 may automatically and periodically transmit the record of the fraudulent transaction associated with the client to the security server 101. These fraudulent transactions present in the system database 102 may be identified by a third-party payment server 105a associated with a payment or transaction system that conducts payment or transactions operated by payment services systems. The third-party payment server 105a may identify such fraudulent transactions when transaction amount is above a threshold amount or an average amount to computing devices. The third-party payment server 105a may publish payment status records and transaction information in the record of the fraudulent transaction associated with the client in the system database 102.

The security server 101 upon receiving the record of the fraudulent transaction associated with the client may then determine one or more attributes corresponding to the fraudulent transaction associated with the client. The one or more attributes corresponding to the fraudulent transaction associated with the client may include a transaction amount, a transaction date, and a transaction time. After the determination of the attributes corresponding to the fraudulent transaction, the security server 101 tag attributes in all transactions that match with the one or more attributes corresponding to the fraudulent transaction associated with the client. The security server 101 stores the tagged attributes into a tag table within the system database 102.

Subsequently, the security server 101 may identify a session record that may include one or more session attributes that match with the tagged attributes corresponding to the fraudulent transaction associated with the client. In an embodiment, the session record may be a web-based interaction between a client computer and a webserver and may include a session identifier, a timestamp, and a customer identifier. The one or more session attributes of the session record may include at least a device identifier uniquely identifying the client computer. The device identifier uniquely identifying the client computer may be selected from a group consisting at least one of a phone number, an IP address, and a device ID.

The security server 101 upon identifying the session record that may include one or more session attributes that match with the tagged attributes corresponding to the fraudulent transaction associated with the client, further determines one or more other session records associated with one or more clients having session attributes matching with the one or more session attributes of the session record. Upon the identification of one or more session records associated with the one or more clients have the session attributes that match the one or more session attributes of the session record, the security server 101 determines a total number of clients from the one or more clients across the one or more session records that are unique. New fraud alerts elements are then generated by the security server 101 for each of the unique clients. The security server 101 generates new fraud alert elements, which may include data fields containing data corresponding to their associated customer identifier. The new fraud alert elements generated by the security server 101 may also include log files and/or machine-readable code containing data fields describing a detected fraudulent event associated with a data channel.

Alert-generating systems 105 may be computing systems capable of generating alert elements. In some embodiments, the alert-generating systems 105 may be alert-generating devices such as computing devices comprising a processor capable of generating alert elements without limiting the scope of the present disclosure. These computing devices may operate independently or be associated with the CSR computer or the security server 101. For instance, the exemplary system 100 in FIG. 1 shows three alert-generating systems 105: a third-party payment server 105a, a webserver 105b, and security devices 105c. However, it should be appreciated that other embodiments may comprise additional or alternative types of devices, or may omit one or more of the alert-generating systems 105 described herein.

The alert-generating systems 105 may be coupled to a security server 101 via one or more networks 112 and networking devices. In some instances, an alert-generating system 105 may be within the logical boundaries of an enterprise network, such as a webserver 105b, or may be a gateway device, such as a network security device 105c (e.g., firewall, proxy server). Additionally, in some cases, an alert-generating system 105 may be a device that is external to the enterprise network, such as a third-party payment server 105a (e.g., FedWire, SWIFT, ACH). The alert-generating system 105 may generate alert elements containing data fields that are associated with the communication channel and type of alert-generating system 105. For example, a third-party payment server 105a may generate an alert element containing data elements related to money transfers or transaction requests, such as account identifiers, customer identifiers, a timestamp, and the amount of money at issue.

As described earlier, the exemplary system 100 in FIG. 1 shows three alert-generating systems 105: a third-party payment server 105a, a webserver 105b, and security devices 105c. A third-party payment server 105a may be a server associated with a payment or transaction system that conducts payment or transactions operated by payment services systems, such as the Society for Worldwide Interbank Financial Telecommunication (SWIFT), Fedwire, and the Automated Clearing House (ACH), among others. Although a third-party payment server 105a is shown in FIG. 1, one having skill in the art would appreciate that embodiments may comprise any number of third-party payment servers 105a operated by any number of payment services. The third-party payment server 105a may be external to the enterprise network and may be coupled via one or more networks 112 to the security server 101, network nodes, or other computing devices internal to the enterprise network. The third-party payment server 105a may publish payment status records of customers and transmit alert-elements indicating various transaction information according to certain thresholds or predetermined rules, such as generating an alert-element when an irregular transaction amount is identified above a threshold amount or an average amount to computing devices such as the security server 101, network nodes, or other servers of the system 100. These alert elements may be transmitted to subscribing computing devices over one or more networks 112, such as Internet Protocol (IP) based networks and/or telecommunications networks, and formatted with particular data structures according to the particular standards used by the system hosting the third-party payment server 105a.

In some embodiments, a security server 101 may monitor or otherwise subscribe to alert elements generated and published by the third-party payment server 105a. The third-party payment server 105a may communicate the alert elements with the security server 101 over the one or more networks 112, using any number compatible data formats and protocols. The alert elements may indicate the status of payments transactions, such as an irregular transaction amount is identified above a threshold amount or an average amount. The security server 101 may use the alert elements data to update customer transaction records stored in a system database 102 and generate/update integrated alerts based on these new alert elements. In some cases, the alert elements and/or the transaction data that the security server 101 receives from the third-party payment server 105a may trigger execution of priority alert generation that instruct the security server 101 to execute one or more processes, such as generating and transmitting notifications to analysts computers 107 and updating records in the alert element databases 103 and/or integrated alert databases 104, among other processes.

A webserver 105b may be any computing device hosting a website accessible to customer devices 111 via the Internet. The webserver 105b may be any computing device comprising a processor and non-transitory machine-readable storage capable of executing the various tasks and processes described herein. Non-limiting examples of such computing devices may include workstation computers, laptop computers, server computers, laptop computers, and the like. While the exemplary system 100 includes a single webserver 105b, one having skill in the art would appreciate that in some embodiments the webserver 105b may include any number of computing devices operating in a distributed computing environment.

The webserver 105b may execute software applications configured to host a website (e.g., Apache®, Microsoft IIS®), which may generate and serve various webpages to customer devices 111. The website may be used to generate and access data stored on a system database. In some implementations, the webserver 105*b* may be configured to require user authentication based upon a set of user authorization credentials (e.g., username, password, biometrics, cryptographic certificate). In such implementations, the webserver 105*b* may access a system database 102 configured to store user credentials, which the webserver 105*b* may be configured to reference in order to determine whether a set of entered credentials purportedly authenticating the user match an appropriate set of credentials that identify and authenticate the user. Similarly, in some implementations, the webserver 105*b* may generate and serve webpages to the customer devices 111 based upon a customer role (e.g., administrator, investor) within the system 100. In such implementations, the customer role may be defined by data fields in customer records stored in the system database 102, and authentication of the user and user role may be conducted by the webserver 105*b* by executing an access directory protocol. The webserver 105*b* may then be instructed to generate webpage content, access or generate data stored in the system database 102, according to the user role defined by the user record in the system database 102.

In some embodiments, as the webserver 105*b* may require users to authenticate using credentials that identify a user as a valid customer of the enterprise system 100, the webserver 105*b* may generate alert-elements related to user's interactions with the website hosted by the webserver 105*b*. For example, the webserver 105*b* may generate the alert-elements indicating a failed authentication attempt received from a customer device 111. As another example, the webserver 105*b* may generate the alert-elements when the user performs or otherwise requests unusual actions. For instance, the user may open multiple new accounts associated with a customer identifier, or the user may move unusually large amounts of money between accounts or to accounts at a different financial institution. In such cases, the webserver 105*b*, a security server 101, or other server of the enterprise system 100 may generate a model for typical or atypical behaviors of the particular customer. The model, for example, may indicate an average or threshold amount of money that may be involved in a transaction based on an average amount that the customer moves or based on a preset amount inputted by the customer or system administrator. It should be appreciated that these are only examples of the alert-elements that may be generated by the webserver 105*b*, and the webserver 105*b* may generate the alert-elements for any number of interactions with the website.

In some embodiments, a webserver 105*b*, or other server of the system 100, may generate session records for an interaction between the customer device 111 and the webserver 105*b*. A session record may contain data fields related to the interaction, such as a session identifier, a timestamp, a customer identifier, and source device information identifying the customer device 111 (e.g., IP address, MAC address). The webserver 105*b* may store the session records locally or in a database hosted on any server within the enterprise network. The webserver 105*b* may capture data for the session at different times of the interactions, such as capturing source device information from header portions of IP packets, or customer identifier information from an authentication attempt. In some instances, a session may transition between channels. For example, a session may begin when a user accesses the website and is properly authenticated as a customer. The user may then experience difficulties in accessing certain features or may identify certain irregularities in their account information, prompting the user to contact a CSR over the telephone. The session information for that additional contact may continue as the session transitions from a web-based channel to a telephone-based channel. The CSR may input various information fields into a GUI presented on a CSR computer 109, such as the purported customer who is contacting the CSR and source device information. In some instances, customer identifier data and/or source device information may be received through an automated interactive voice response (IVR) server (not shown) of a helpdesk portion of the system 100. The session record may contain data gathered through the web-based interactions from customer device 111 and the telephone-based interaction from the CSR computer 109 and/or IVR system.

Security devices 105*c* may be any computing device of the enterprise network that supports network security and network traffic management efforts. Non-limiting examples of security devices 105*c* may include a proxy server, a firewall, an intrusion detection device, and the like. The security device 105*c* may generate an alert element in response to performing a security function, such as blocking data traffic from a particular source IP address or device, based on configurations of the security device 105*c*.

In some embodiments, security devices 105*c* may be a proxy server that may be a computing device, such as a server, configured to manage network communications between the enterprise network computing devices, such as customer devices 111 and external resources accessible via the network 112, such as websites or web-based applications hosted on external servers. The proxy server may provide a proxy gateway in effect when the communications inside or outside of the system 100 are prohibited. The proxy server may receive web-service queries from plural customer devices 111 and operates to transfer the received web-service queries to external servers for providing a target service the customer devices 111 would like to reach.

In some implementations, the proxy server may receive a web-service query from the customer devices 111. The proxy server uses the IP address that corresponds to the physical address of the customer devices 111 for the communications with the customer devices 111. The proxy server may have a function of relaying a customer's access to a resource or the data of a website, for example. The customer devices 111 communicate with the proxy server without direct communications with the external servers. The proxy server may review and filter data traffic with web-based resources, provide anonymity to customer devices 111, and log data traffic (e.g., inbound and outbound web-service requests). During operation, the proxy server may capture header information regarding the source customer device 111 to determine whether to permit or block incoming data traffic based on which the security device 105*c*, such as the proxy server, may then generate alert elements and then transmit alert elements that are then stored into an alert element database 103.

A CSR computer 109 may be any computing device comprising a processor and capable of performing the various processes and tasks described herein. The CSR computer 109 may be coupled to helpdesk software, such as queuing system or IVR system, such that the CSR computer 109 allows a CSR to interact with a caller over the phone, but can also capture telephony information regarding an ongoing call. The CSR computer 109 may produce an interactive graphical user interface (GUI) that allows the CSR to navigate the website and account information for a caller, if the caller is an authenticated customer, and may allow the CSR to generate, update, and monitor records or "tickets" of ongoing helpdesk requests for caller concerns. The software executed by the CSR computer 109 may also automatically, or through a user-driven input, generate alert elements associated with a customer identifier. These alert elements may then be stored into an alert element database 103.

Analyst computers 107 may be computing devices that fraud or security engineering analysts may use to identify and mitigate fraud or security threats. An analyst computer 107 may be any computing comprising a processor and capable of performing the various tasks and processes described herein. Non-limiting examples of an analyst computer 107 may include laptops, desktops, servers, tablets, and smartphones. An analyst computer 107 may be coupled via one or more internal or external networks to an integrated alert database 104. Software executed by the analyst computer 107 permits an analyst to select an integrated alert from the integrated alert database 104 and then review or update data stored in the database record for the selected integrated alert. Conventional approaches would allow an analyst to select which alert element to address next from a queue. However, such approaches are often ineffective or inefficient; a user-selected alert element may not be the highest priority item, the alert element may be redundant or otherwise related to another alert element that was already resolved, or the alert element may be unrelated to the expertise of the analyst. Based on a risk score calculated for integrated alerts, the analyst computer 107 presents an analyst with the integrated alert record to address next. The risk score can prioritize the queue for the analyst computer and can continuously update the risk score, and thus the prioritization, within the queue. Addressing an integrated alert can reduce queue volume because addressing an integrated alert can address multiple underlying alert elements, thereby reducing the resources required to host an ever-growing database of alerts.

The analyst computer 107 GUI may receive integrated alerts that are related to subject matter (e.g., type of threat) or procedural role (e.g., time-sensitive threat, backlog timing) of the respective analyst. In some implementations, integrated alerts may have a data field indicating identifying the nature of the potential threat and another data field indicating a time-sensitive nature or customer-sensitive nature of the potential threat. Based on this data field, the analyst computer 107 may receive integrated alerts having subject matter or procedural data fields associated with the analyst credentials. For instance, the analyst credentials of an analyst specializing in time sensitive integrate alerts would indicate to the analyst computer 107 that the analyst computer 107 should retrieve and present an integrated alerts having a data field indicating that the particular integrated alert is time sensitive. In some implementations, the integrated alerts may be stored into dedicated databases or sub-databases of the integrated alert database 104, where each sub-database is configured to store integrated alerts with certain types of integrated alerts. In such implementations, the analyst computer 107 may be limited to accessing certain sub-databases according to the analyst credentials of the analyst operating the analyst computer 107. Similarly, the analyst computer 107 may receive updates or notification messages that the analyst computer 107 presents on a GUI to the analyst. A security server 101, integrated database 104, or other server of the system 100 may trigger and transmit the notification to each analyst computer 107 having analyst credentials with access attributes indicating the role of the analyst. For instance, an analyst may have analyst credentials with attributes that indicate the analyst specializes in handling time-sensitive integrated alerts. When a new integrated alert is generated or an existing integrated alert is updated with a data field indicating the integrated alert is time sensitive, the security server 101 or other device may transmit a notification message to the analyst computer of the analyst computer 107.

In some implementations, an analyst computer 107 may have a GUI that allows an analyst to mark or "tag" an integrated alert or alert element. A data field in the record of the integrated alert or alert element is then updated to reflect the tag inputted by the analyst computer 107. In some instances, the tag reflects an analyst's concern that an integrated alert or alert element may contain data fields that could be cross-referenced and found in another integrated alert or alert element. The security server 101 or other server of the system 100 may then perform various forms of processing on the data fields, such as identifying which, if any, other integrated alerts or alert elements contain the same data in corresponding data fields. In some embodiments, the security server 101, the analyst computer 107, or other device of the system 100 may execute various models that indicate to the security server 101 that an integrated alert or alert element should be "tagged." Integrated alerts or alert elements may be tagged automatically when data fields in an integrated alert or alert element matches a threshold number of data fields of a given model.

The one or more alert-generating systems 105 may also include a case management server (not shown) that may be a computing device, such as a server, configured to host a case management database which may be a separate database or a sub database within the system database 102. The case management database may be configured to store a plurality of security records such as a whitelist record and a blacklist record. The plurality of security records may include characteristic information about suspect device IP address and/or device IDs that pass and fail a credibility threshold. In some embodiments, upon determining that the device IP address and/or device IDs fails an acceptability threshold of risk score, the security server 101 may update the whitelist record and/or the blacklist record in the case management database with the details of the device IP address and/or device IDs that failed the acceptability threshold of their corresponding risk score. After updating the case management database, the security server 101 may transmit an alert to analyst computer 107 identifying the unique device IP address and/or device IDs that failed the acceptability threshold of risk score.

The one or more alert-generating systems 105 may also include networking appliances (not shown) that may include any computing device capable of generating and/or storing network logs, sometimes referred to as "log files." The logs may be stored in any machine-readable format (e.g., TXT, XML, HTML, Access Log, Common Log, W3C Log, WAS Log) and may comprise various data fields containing data at various OSI layers from inbound IP packets (e.g., source IP address, source Domain Name, source MAC address, source device identifier). In some implementations, the logs may be stored locally in the particular network appliance or device that generated the logs, such as proxy servers, routers, firewalls, and security software applications configured to manage and track enterprise security risks. In some implementations, the logs may be stored into a system database 102 that is accessible to a security server 101 locally (on the same device) or via a network 112. The networking appliances may generate an alert element in response to performing a security function, such as blocking data traffic from a particular source Domain Name, source MAC address, and source device identifier.

Customer devices 111 may be any computing and/or telecommunications device comprising a processor and capable of performing the various tasks and processes described herein, such as accessing a webserver 105b and providing a GUI interface to a user to interact with a customer-centric website hosted on the webserver 105b. Non-limiting examples of a customer device 111 may include a telephone 111a (e.g., POTS landline telephone, cellular telephone, smartphone), a client computer 111b (e.g., desktop, laptop, server, tablet), or any other telecommunications or computing device used to communicate with enterprise services.

In some embodiments, the customer device 111 may be any computing device allowing a customer to interact with the security server 101 via a webserver 105b. The customer device 111 may execute an Internet browser or local application that access the webserver 105b in order to issue requests or instructions to the security server 101 to access the system 100. The customer device 111 may transmit credentials from user inputs to the webserver 105b, from which the webserver 105b may authenticate the user and, in some implementations, determine a user role. One having skill in the art would appreciate that the customer device 111 may comprise any number of input devices configured to receive any number of data inputs (e.g., mouse, keyboard, touchscreen, stylus), including various types of data inputs allowing for authentication, e.g., username, passwords, certificates, biometrics. One having skill in the art would also appreciate that the customer device 111 may be any computing device comprising a processor and non-transitory machine-readable storage medium allowing the customer device 111 to perform the various tasks and processes described herein.

As an example of the customer device 111 operation, the customer device 111 may execute an Internet browser that accesses a webserver 105b hosting a website that allows for customers to access to their financial accounts and allows promoters to advertise products to potential customers. Using the customer device 111, a customer may select a product on the customer-centric website. As the transaction proceeds, the customer device 111 of the customer may be used upload machine-readable computer files (e.g., PDF, DOC, XSL) containing transaction information. The computer files may be stored into document records in the system database 102. The customer device 111 may issue queries or instructions to the security server 101 via the webpages generated by the webserver 105b, which then instruct the security server 101 to perform various tasks, such as retrieving or updating a file from the system database 102.

Alert element databases 103 and/or integrated alert databases 104 may be hosted on any server (such as a security server 101) and/or alert-generating systems 105 and are capable of storing the alert elements and/or integrated alert in plain format and/or encrypted version containing data fields that are associated with the communication channel and type of alert-generating system. The alert element databases 103 and/or integrated alert databases 104 may be in communication with a processor of the security server 101 and/or alert-generating systems 105, where the processor is capable of executing the various commands of the system 100. In some embodiments, the alert element databases 103 and/or integrated alert databases 104 may be part of the security server 101. In some embodiments, the alert element databases 103 and/or integrated alert databases 104 may be a separate component in communication with the security server 101 and/or alert-generating systems 105.

The alert element databases 103 and/or integrated alert databases 104 may be in communication to each other via the network 112 and include a non-transitory machine-readable storage media capable of receiving, storing, updating alert elements and/or integrated alert stored in the alert element databases 103 and/or integrated alert databases 104. The alert element databases 103 and/or integrated alert databases 104 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the security server 101 and/or alert-generating systems 105.

In some embodiments, a memory of the alert element databases 103 and/or integrated alert databases 104 may be a non-volatile storage device for storing alert element data and instructions, to be used by a processor of the security server 101 and/or alert-generating systems 105. The memory may be implemented with a magnetic disk drive, an optical disk drive, a solid-state device, or an attachment to a network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory.

In some embodiments, a memory of alert element databases 103 and/or integrated alert databases 104 may be a temporary memory, meaning that a primary purpose of the memory is not long-term storage. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

A system database 102 may be hosted on one or more computing devices, where the system database 102 may store data records associated with various aspects of the application services offered to end customers. Non-limiting examples of what may be stored in the system database 102 may include user records that may comprise data fields describing users, e.g., customer data, such as customer credentials (e.g., username, passwords, biometrics, encryption certificates), customer account data, customer roles, or customer permissions; document records that may comprise machine-readable computer files (e.g., word processing files), parsed portions of such computer files, or metadata associated with computer files; and application data that may include software instructions executed by a security server 101 or data used by the such applications executed by the security server 101. The system database 102 may be hosted on any number of computing devices comprising a non-transitory machine-readable storage medium and capable of performing the various tasks described herein. As shown in FIG. 1, the system database 102 may be accessed by the security server 101 and other servers and devices of the system 100 via one or more networks 112. The system database 102 may be hosted on the same physical computing device functioning as the security server 101 and/or functioning as other servers and devices of the system 100.

A case management database (not shown) may be hosted by a case management server, which is one of the alert-generating systems 105. The case management database may be a separate database or a sub database within a system database 102. The case management database is configured to store a plurality of security records such as a whitelist record and a blacklist record. The plurality of security records may include characteristic information about suspect device IP address and/or device IDs that pass and fail a credibility threshold. In some embodiments, upon determining that the device IP address and/or device IDs fails an acceptability threshold of risk score, the security server 101 may update the whitelist record and/or the blacklist record in the case management database with the details of the device IP address and/or device IDs that failed the acceptability threshold of their corresponding risk score. After updating the case management database, the security server 101 may transmit an alert to an analyst computer 107 identifying the unique device IP address and/or device IDs that failed the acceptability threshold of risk score.

Figure 2:
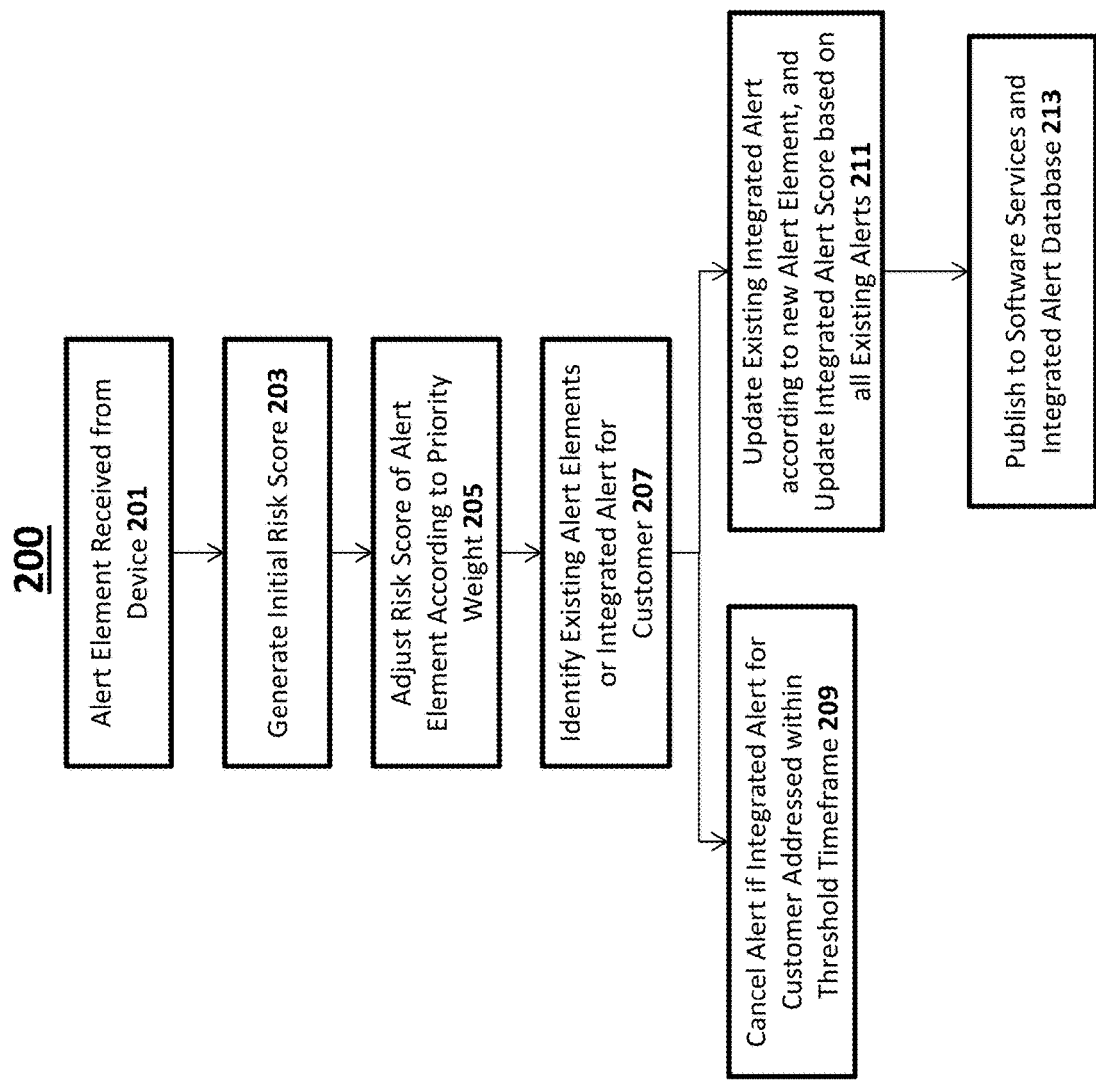
FIG. 2 shows execution of a method for generating one alert for a customer based on multiple possible fraud events for the customer, according to an exemplary embodiment.

FIG. 2 shows execution steps of generating one alert for a customer based on multiple possible fraud events for the customer, according to an exemplary method 200. The exemplary method 200 shown in FIG. 2 comprises execution steps 201, 203, 205, 207, 209, 211. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 200 of FIG. 2 is described as being executed by a single server computer, referred to as a security server in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as the security server described herein.

In a first step 201, the security server receives an alert element from an alert-generating system or a CSR computer and stores the alert element into an alert element database. The alert-generating system may be any computing device comprising a processor capable of generating alert elements. The alert-generating system may be coupled to a security server via one or more networks and networking devices. In some instances, the alert-generating system may be within the logical boundaries of an enterprise network, such as a webserver, or may be a gateway device, such as a network security device (e.g., firewall, proxy server) capable of generating alert elements. In some cases, an alert-generating system may be a device that is external to the enterprise network, such as a third-party payment server (e.g., FedWire, SWIFT, and ACH) capable of generating alert elements.

In some embodiments, the alert-generating system may be configured to generate alert elements containing data fields that are associated with the communication channel and type of alert-generating system. For example, a third-party payment server may generate an alert element containing data elements related to money transfers or transaction requests, such as account identifiers, customer identifiers, a timestamp, and the amount of money at issue. Upon generating the alert element, the alert-generating system may also generate a notification message to be transmitted to the security server indicating the details of the alert element. The notification may be in any number of data formats and may be transmitted to the security server and any number of devices through the associated networks and channels. Non-limited examples of the corresponding notification transmission channels may include any number of IP-based computer networks and/or telecommunications networks. Non-limiting examples of data formats of the notification message may include application-specific notifications, and e-mails, among others. The notification message may also indicate data payment information, e.g., amount and payee identifiers.

The alert element may include log files and/or machine-readable code containing data fields describing a detected event associated with a data channel. For instance, a webserver may require users to authenticate as valid, recognized customer of the enterprise system. The webserver may generate an authentication-failure alert element upon receiving improper authentication credentials from a customer device. The data fields of an authentication-failure alert element may contain data fields associated with the detected event, such as data fields describing the source device and data fields describing the particular customer account the user was attempting to access.

In a next step 203, the security server generates an initial risk score. When generating a new integrated alert, the security server may generate the initial risk score based on one or more incoming alert elements that are associated with a customer identifier of a customer. Based on the data fields of the integrated alerts, the security server may determine a risk score based on an algorithm that the security server or any other server of the system applies to the data fields of the alert elements underlying the particular integrated alert. The security server then adjusts the risk score of the alert element according to priority weight, at step 205. The priority weight may be determined based on a type and nature of threat or a time-sensitive threat/customer-sensitive nature of the potential threat.

In a next step 207, the security server may query an alert element database or an integrated alert database to potentially identify existing alert elements or an integrated alert for the customer identifier matched to a customer identifier in a data field of one or more alert elements or integrated alerts.

In a next step 209, upon the security server identifying an integrated alert matched to an incoming alert element, the security server will determine whether the integrated alert is marked as completed by an analyst or has expired after a threshold timeframe of not being addressed by an analyst. If the security server determines from the data fields of an existing integrated alert that the integrated alert for the customer identifier was addressed within a threshold timeframe, then the security server cancels the integrated alert. In this step, the security server may further delete the incoming alert element or otherwise not update the existing integrated alert with the incoming alert element.

In a next step 211, upon identifying an existing integrated alert with a customer identifier matched to the customer identifier in the incoming alert element, the security server may update the integrated alert to include data fields from the incoming alert element. The security server may further update the integrated alert risk score based upon the risk scores and policy weights for the aggregated alert elements underlying the integrated alert, and publishes into software services and the integrated alert database, at step 213.

Figure 3:
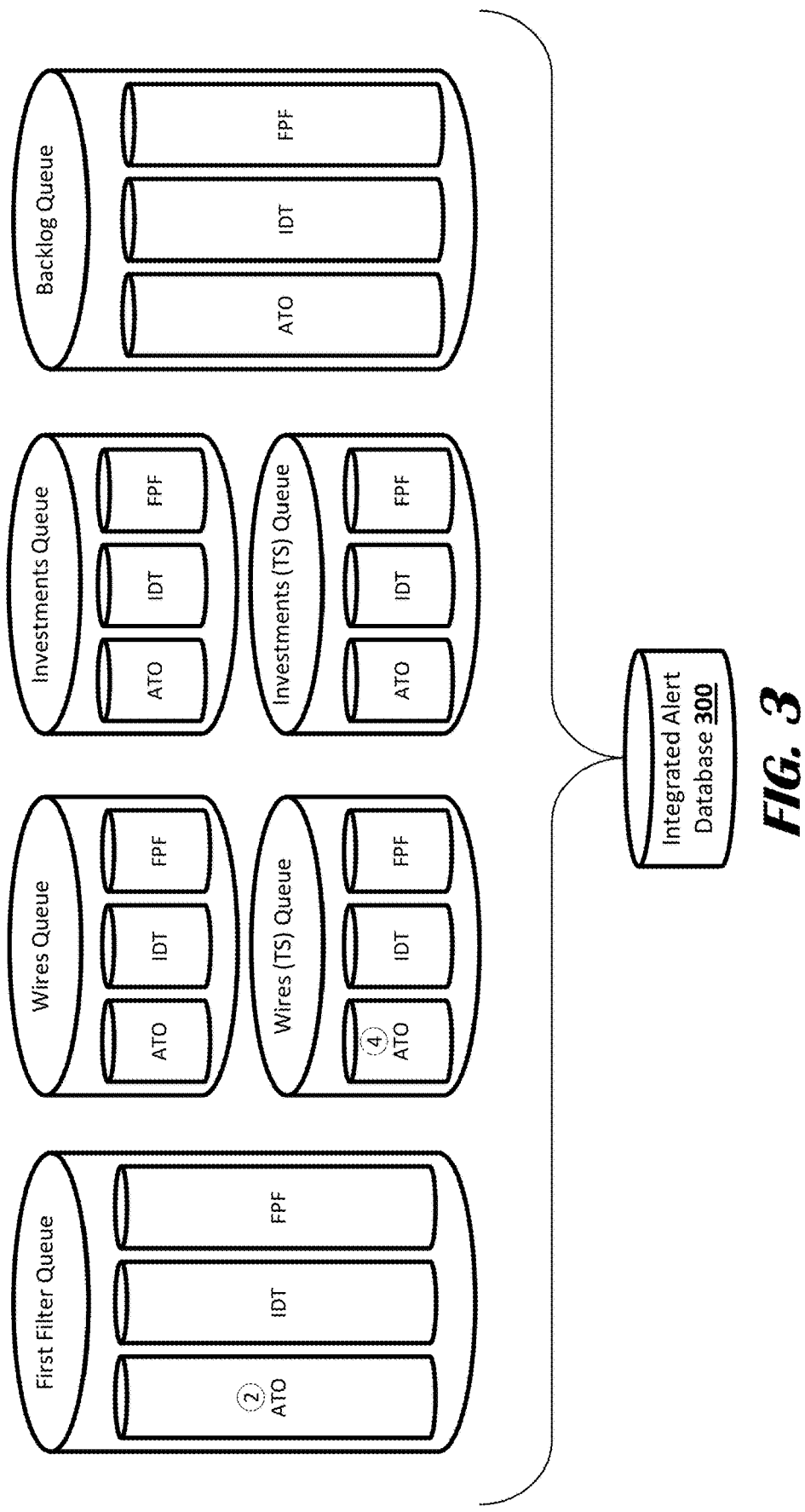
FIG. 3 shows a scenario example of movement of integrated alerts in order to be addressed by an analyst, according to an exemplary embodiment.

FIG. 3 shows a scenario example of movement of integrated alerts from an integrated alert database 300 in order to be addressed by an analyst, according to an exemplary embodiment. As shown, an integrated alert database 300 may move the integrated alerts to analyst computers that may be computing devices that fraud or security engineering analysts may use to identify and mitigate fraud or security threats. The analyst computers may be coupled via one or more internal or external networks to the integrated alert database 300. Software executed by the analyst computer permits an analyst to select an integrated alert from the integrated alert database 300 and then review or update data stored in the database record for the selected integrated alert. Based on a risk score calculated for integrated alerts, the analyst computer presents an analyst with the integrated alert record to address next.

An analyst computer GUI may receive integrated alerts that are related to a particular subject matter. For example, integrated alerts may have a data field indicating identifying the nature of the potential threat, and a data field indicating a time-sensitive nature or customer-sensitive nature of the potential threat. Based on this data field, the analyst computer may receive integrated alerts having subject matter or procedural data fields associated with the analyst credentials. For instance, the analyst credentials of an analyst specializing in time sensitive integrate alerts would indicate to the analyst computer that the analyst computer should retrieve and present an integrated alerts having a data field indicating that the particular integrated alert is time sensitive. In some implementations, the integrated alerts may be stored into dedicated databases or sub-databases of the integrated alert database 300, where each sub-database is configured to store integrated alerts with certain types of integrated alerts. In such implementations, the analyst computer may be limited to accessing certain sub-databases of the integrated alert database 300 according to the analyst credentials of the analyst operating the analyst computer.

For instance, in the illustrated example, there are six integrated alert queues in sub-databases of the integrated alert database 300, namely, a first filter queue, a wires queue, a wires (TS) queue, an investments queue, an investments (TS) queue, and a backlog queue. The analyst computer may be limited to accessing a first filter queue, a wires queue, a wires (TS) queue, an investments queue, an investments (TS) queue, and a backlog queue in the sub-databases according to the analyst credentials of the analyst operating the analyst computer. For example, all third-party analysts who do not work wires may be assigned to a first filter queue as their highest priority. The integrated alerts in the first filter queue may include all scenarios that are prioritized the same and are not regulatory and referrals alerts. All first-party analysts who do not work investment or interdicted wires may be assigned to a wires time sensitive (TS) queue as their highest priority. The integrated alerts in the wires (TS) queue may include all scenarios that are prioritized the same, and are related to regulatory, service-level obligation, and customer-initiated referral alerts. Only investment analysts may be assigned to an investments time-sensitive (TS) queue as their highest priority. The integrated alerts in the investments (TS) queue may include all scenarios that are prioritized the same. All first-party analysts who do not work in investment or interdicted wires may be assigned to a wires queue as their second highest priority. The integrated alerts in the wires (TS) queue may include all scenarios that are prioritized the same, and are related to regulatory and referral alerts. Only investment analysts may be assigned to an investments queue as their second highest priority. The integrated alerts in the investments (TS) queue may include all scenarios that are prioritized the same. Furthermore, integrated alerts may be assigned manually in a backlog queue.

During operation, in the illustrated example, a security server or other server of a system executes an algorithm on an integrated alert (for example, associated with debit card fraud transaction) to determine a priority based on the integrated alert relative risk score. After determining the priority of the integrated alert, the security server may assign the integrated alert in a first filter queue. A third-party analyst assigned to work on integrated alerts in the first filter queue may query and fetch the integrated alerts from the first filter queue hosted within an integrated alert database. The third-party analyst addresses the integrated alert associated with debit card fraud transaction and assigns a "refer alert suspicious" status to the integrated alert based on the analysis of the integrated alert. The security server or other server of the system may execute an algorithm on the integrated alert assigned a "refer alert suspicious" status to determine a new priority based on their relative revised status and risk score. Based on the determined revised priority, the security server may assign the integrate alert having the "refer alert suspicious" status in the wires time sensitive (TS) queue. A first-party analyst assigned to address alerts in the wires time sensitive (TS) queue may then query and fetch the integrated alert having the "refer alert suspicious" status from the first filter queue in the integrate alert database and address it.

Figure 4:
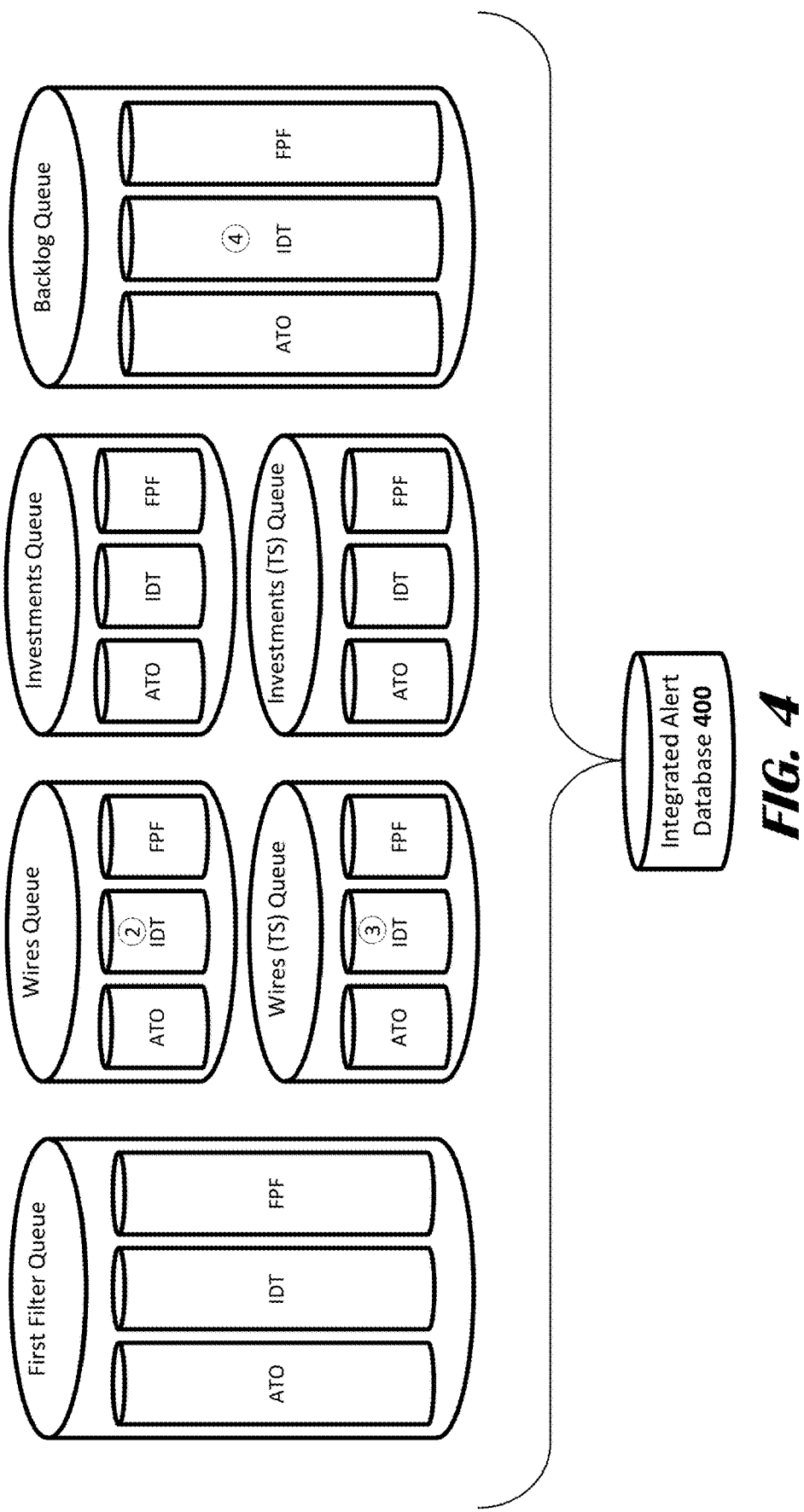
FIG. 4 shows a scenario example of movement of integrated alerts in order to be addressed by an analyst, according to an exemplary embodiment.

FIG. 4 shows a scenario example of movement of integrated alerts from an integrated alert database 400 in order to be addressed by an analyst, according to an exemplary embodiment. In the illustrated example, there are six integrated alert queues in sub-databases of the integrated alert database 300, namely, a first filter queue, a wires queue, a wires (TS) queue, an investments queue, an investments (TS) queue, and a backlog queue. The analyst computer may be limited to accessing a first filter queue, a wires queue, a wires (TS) queue, an investments queue, an investments (TS) queue, and a backlog queue in the sub-databases according to the analyst credentials of the analyst operating the analyst computer. For example, all third-party analysts who do not work wires may be assigned to a first filter queue as their number one priority. The integrated alerts in the first filter queue may include all scenarios that are prioritized the same and are not regulatory and referrals alerts. All first-party analysts who do not work investment or interdicted wires may be assigned to a wires time sensitive (TS) queue as their number one priority. The integrated alerts in the wires (TS) queue may include all scenarios that are prioritized the same, and are related to regulatory, service-level obligation, and customer-initiated referral alerts. Only investment analysts may be assigned to an investments time-sensitive (TS) queue as their highest priority. The integrated alerts in the investments (TS) queue may include all scenarios that are prioritized the same. All first-party analysts who do not work in investment or interdicted wires may be assigned to a wires queue as their second highest priority. The integrated alerts in the wires (TS) queue may include all scenarios that are prioritized the same, and are related to regulatory and referral alerts. Only investment analysts may be assigned to an investments queue as their number two priority. The integrated alerts in the investments (TS) queue may include all scenarios that are prioritized the same. Furthermore, integrated alerts may be assigned manually in a backlog queue.

During operation, in the illustrated example, a security server or other server of a system executes algorithm on an integrated alert (associated with consumer loan fraudulent account to be addressed within a first period of time) to determine a priority based on the integrated alert relative risk score. After determining the priority of the integrated alert, the security server may assign the integrate alert associated with consumer loan fraudulent account in the wires queue. The security server upon determining that the first-party analyst assigned to work on integrated alerts in the wires queue have not addressed the integrated alert associated with consumer loan fraudulent account for more than a pre-defined period of time, the security server may then transfer the integrate alert associated with consumer loan fraudulent account in the wires (TS) queue. The security server upon determining that the first-party analyst assigned to work on integrated alerts in the wires (TS) queue have not addressed the integrated alert associated with consumer loan fraudulent account with the first period of time, the security server may then transfer the integrate alert in a backlog queue.

Figure 5:
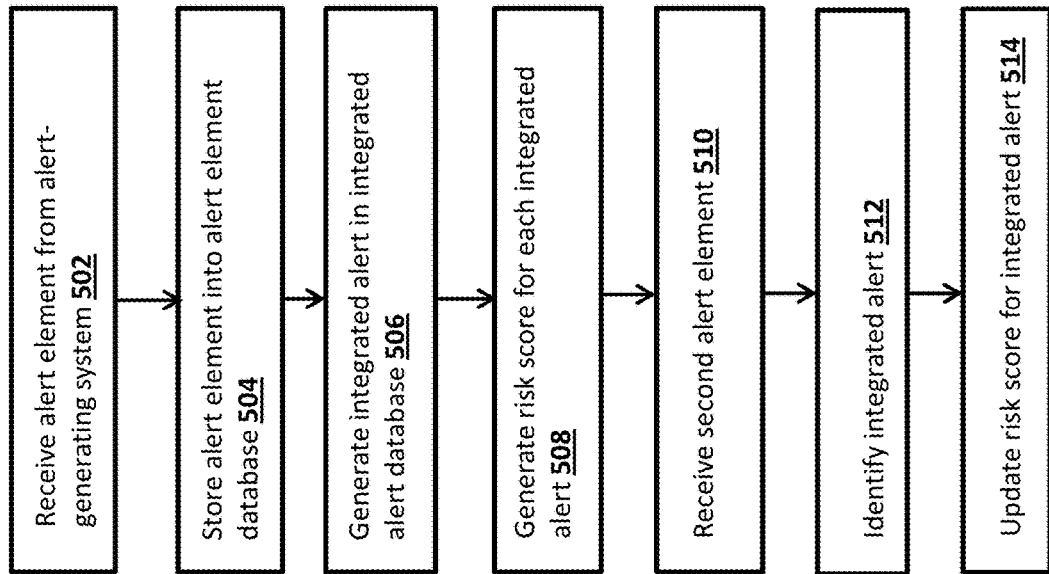
FIG. 5 shows execution of a method of risk management for detecting fraud, according to an exemplary embodiment.

FIG. 5 shows execution steps of risk management for detecting fraud, according to an exemplary method 500. The exemplary method 500 shown in FIG. 5 comprises execution steps 502, 504, 506, 508, 510, 512, 514. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 500 of FIG. 5 is described as being executed by a single server computer, referred to as a security server in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as the security server described herein.

In a first step 502, a security server receives an alert element from an alert-generating system or a CSR computer. The alert-generating system may be any computing device comprising a processor capable of generating alert elements. The alert-generating system may be coupled to a security server via one or more networks and networking devices. In some instances, an alert-generating system may be within the logical boundaries of an enterprise network, such as a webserver, or may be a gateway device, such as a network security device (e.g., firewall, proxy server). In addition, in some cases, an alert-generating system may be a device that is external to the enterprise network, such as a third-party payment server (e.g., FedWire, SWIFT, and ACH). In some embodiments, the alert-generating system may be configured to generate alert elements containing data fields that are associated with the communication channel and type of alert-generating system. For example, a third-party payment server may generate an alert element containing data elements related to money transfers or transaction requests, such as account identifiers, customer identifiers, a timestamp, and the amount of money at issue.

In some embodiments, the security server may match attributes of the one or more alert elements received from the one or more alert-generating systems with a set of one or more scenario attribute models. The security server then determine a scenario from the set of one or more scenario attribute models that is matched with the one or more alert elements received from the one or more alert-generating systems. The scenario from the set of one or more scenario attribute models may identify a particular type of fraud or attack.

In a next step 504, a security server stores the alert element containing various data fields indicating threats of fraud or attempts to penetrate an enterprise network and indicating one or more particular customers of the system associated with an alert element (often the target of a type of fraud) into an alert element database.

In some embodiments, the alert element may include log files and/or machine-readable code containing data fields describing a detected event associated with a data channel. For example, a webserver may require users to authenticate themself as valid, recognized customer of the enterprise system. The webserver may generate an authentication-failure alert element upon receiving improper authentication credentials from a customer device. The data fields of an authentication-failure alert element may contain data fields associated with the detected event, such as data fields describing the source device and data fields describing the particular customer account the user was attempting to access. The authentication-failure alert element is stored into an alert element database.

In a next step 506, using the alert elements stored in the alert element database, the security server may generate integrated alerts that are associated with customers of the system, and then store the integrated alerts into an integrated alert database. In some embodiments, the security server may generate or update an integrated alert for the customer identifier where the integrated alert is a log file or any other machine-readable code containing data fields that are populated with data that is based on the alert elements associated with the same customer identifier. In this way, regardless of the number of alert elements received for a customer identifier from the alert-generating systems or CSR computers, the integrated alert database contains only a single integrated alert for the particular customer identifier.

In a next step 508, a security server generates a learning algorithm configured to determine a risk associated with each of the set of one or more alert elements. The security server may be configured to generate the learning algorithm, modify the learning algorithm, and execute the learning algorithm. The learning algorithm may include one or more set of rules utilizing varying values and risk characteristics.

The security server may generate a first learning algorithm configured to determine a risk associated with each of the set of one or more alert elements. The first learning algorithm may receive an input of a first learning algorithm dataset. The first learning algorithm dataset is used to generate and train the first learning algorithm. The first learning algorithm dataset may include data associated with a set of one or more scenario attribute models. Each scenario model of the set of one or more scenario attribute models may be computer files stored on a database device, such as a system database, and comprise a set of alert element attributes that indicate a type of scenario of potential fraud or attack. In some cases, each of the set of one or more scenario attribute models may be associated with a different rate of fraud. For example, each of the set of one or more scenario attribute models may be associated with a different percentage of fraud depending on a type of scenario of potential fraud or attack.

The security server may periodically query a database to receive updated data associated with the set of one or more scenario attribute models. The database may be a model database configured to store the data/information associated with the set of one or more scenario attribute models. The security server may then iteratively update the first learning algorithm dataset based on any updated data associated with the set of one or more scenario attribute models.

In some embodiments, the first learning algorithm may employ one or more statistical tools and one or more artificial intelligence systems, and then utilize the one or more statistical tools and the one or more artificial intelligence systems. The one or more statistical tools may include artificial neural networks techniques. For example, a neural network may include an interconnected group of artificial neurons (artificial neural network) that uses a mathematical or computational model for information processing based on a connectionist approach to computation. In some cases, the artificial neural network is in formulation and/or operation, an adaptive system that changes its structure based on external or internal information (such as the data associated with the set of one or more scenario attribute models) that flows through the network. In some cases, the neural networks may be non-linear statistical data modeling tools or decision making tools. The neural networks may be executed to model complex relationships between inputs and outputs or to find patterns in data (such as alert elements).

In some embodiments, the neural networks for fraud detection may have multiple layers. The security server may implement a first layer of the multi-layer neural network using either a nonlinear filter or a nonlinear joint transform correlator (JTC), in association with a supervised perceptron learning algorithm. The security server may implement a second layer of the multi-layer neural network electronically due to a number of hidden layer neurons. The nonlinear filter is generally implemented electronically, while the nonlinear joint transform correlator is generally implemented electronically or optically. The neural network system may be trained with a sequence of input fraud or attach fraud scenarios, and is able to classify a potential fraud activity in real-time. In particular, the security server may train the neural network system by updating reference fraud or attach fraud scenarios in the input which can be stored in electronic memories, without the need of filters or holograms.

In some embodiments, the artificial neural network may involve a network of processing elements (artificial neurons) which may exhibit complex global behavior, determined by the connections between the processing elements and element parameters. One type of artificial neural network may be the recurrent Hopfield net. In a neural network model simple nodes, which may be called variously "neurons", "neurodes", "Processing Elements" (PE) or "units", are connected together to form a network of nodes. The server computer may further use one or more datasets (such as first learning algorithm datasets) for training the neural networks, which can be viewed as an application of optimization theory and statistical estimation. In some embodiments, the server computer may further use one or more applications for training the neural networks, which can be viewed as an application of optimization theory and statistical estimation. Such applications may include, back propagation by gradient descent, Rprop, BFGS, CG etc. Furthermore, evolutionary computation methods, simulated annealing, expectation maximization, non-parametric methods, particle swarm optimization and other swarm intelligence techniques are among other methods for training the neural networks.

Training a neural network model may mean the server computer selecting one model from a set of allowed models (or, in a Bayesian framework, determining a distribution over the set of allowed models) that minimizes the cost criterion. In some instances, the server computer may use one or more applications for training neural network models, which may be viewed as an application of optimization theory and statistical estimation. The applications used by a server computer in training the artificial neural networks may employ a form of gradient descent, which may be by taking a derivative of a cost function with respect to the network parameters and then changing those parameters in a gradient-related direction. Evolutionary methods, simulated annealing, expectation-maximization and non-parametric methods are some methods for training neural networks. Temporal perceptual learning relies on finding temporal relationships in sensory signal streams. In an environment, statistically salient temporal correlations can be found by monitoring the arrival times of sensory signals, which may be done by the perceptual network. The utility of artificial neural network models lies in the fact that the neural networks may be used the server computer to infer a function from observations, which is particularly useful in fraud detection applications where the complexity of the data (such as alert elements) or task makes the manual design of such a function impractical, inefficient, and time-consuming.

The security server may then execute the first learning algorithm on each integrated alert stored in the integrated alert database to generate a risk score for each respective integrated alert. The risk score of the integrated alert may be based upon the one or more data fields in the integrated alert. In some embodiments, the security server when generating a new integrated alert, the security server may generate the risk score based on one or more incoming alert elements that are associated with a customer identifier of a customer. Based on the data fields of the integrated alerts, the security server may determine a risk score based on an algorithm that the security server, or any other server of the system, applies to the data fields of the alert elements underlying the particular integrated alert. In some embodiments, the security server may generate a risk score for the integrated alerts, which the security server uses to store, and sort the integrated alerts according to a priority based on the relative risk scores. The analyst computers may query and fetch integrated alerts from the integrate alert database and then present the integrate alerts to be addressed by an analyst according to the priority level of the respective integrated alerts.

In a next step 510, a security server receives a second alert element. Using the second alert element, the security server determines a customer identifier from the alert-generating systems or CSR computers from which the second alert element is received. The security server then identifies an integrated alert for the particular customer identifier from the integrated alert database, at step 512. Upon the security server identifying the integrated alert for the particular customer identifier associated with the second alert element, at step 514, a security server update the risk score for the integrated alert. In some cases, the security server may also update the risk score for an integrated alert at a predetermined interval (e.g., every 5 minutes) based on other factors; and, in some cases, the security server may update the risk score when a threshold number of alert elements have been received for a customer identifier. The security server or a server hosting the integrated alert database may then sort the integrated alerts according to the risk score, such that the integrated alerts may be presented on a GUI of an analyst computer in order of priority as indicated by the relative risk scores.

Figure 6:
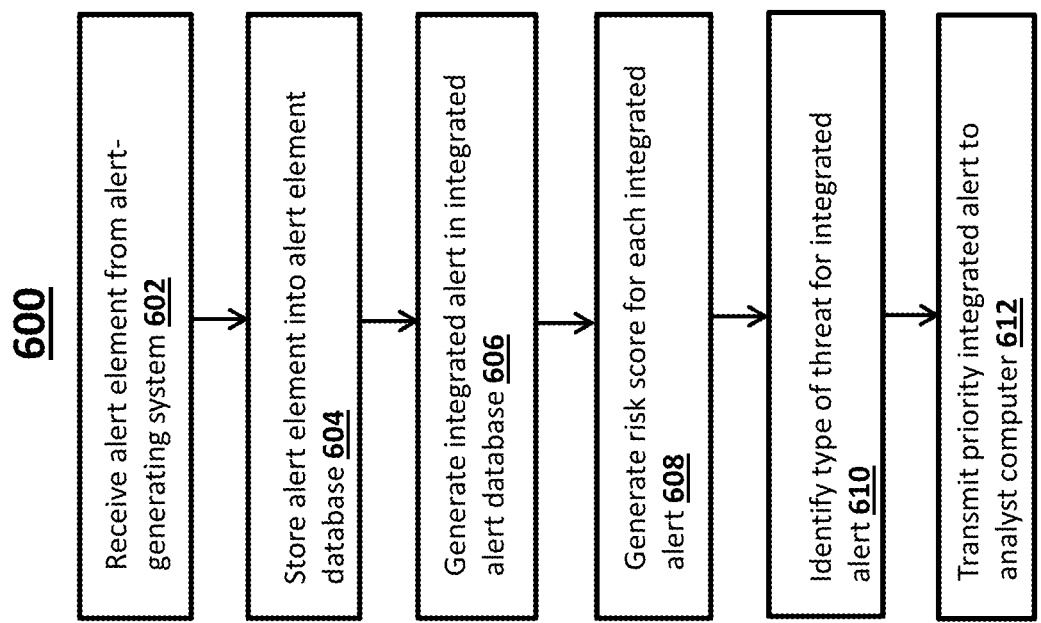
FIG. 6 shows execution of a method for prioritization of issues in an alert queue by generating and updating risk score for alerts, according to an exemplary embodiment.

FIG. 6 shows execution steps of prioritization of issues in an alert queue by generating and updating risk score for the alerts, according to an exemplary method 600. The exemplary method 600 shown in FIG. 6 comprises execution steps 602, 604, 606, 608, 610, 612. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 600 of FIG. 6 is described as being executed by a single server computer, referred to as a security server in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as the security server described herein.

In a first step 602, a security server receives an alert element from an alert-generating system or a CSR computer. The alert-generating system may be any computing device comprising a processor capable of generating alert elements. The alert-generating system may be coupled to a security server via one or more networks and networking devices. In some instances, an alert-generating system may be within the logical boundaries of an enterprise network, such as a webserver, or may be a gateway device, such as a network security device (e.g., firewall, proxy server). In addition, in some cases, an alert-generating system may be a device that is external to the enterprise network, such as a third-party payment server (e.g., FedWire, SWIFT, and ACH). In some embodiments, the alert-generating system may be configured to generate alert elements containing data fields that are associated with the communication channel and type of alert-generating system. For example, a third-party payment server may generate an alert element containing data elements related to money transfers or transaction requests, such as account identifiers, customer identifiers, a timestamp, and the amount of money at issue.

In a next step 604, a security server stores the alert element containing various data fields indicating threats of fraud or attempts to penetrate an enterprise network, and indicating one or more particular customers of the system associated with an alert element (often the target of a type of fraud) into an alert element database.

In some embodiments, the alert element may include log files and/or machine-readable code containing data fields describing a detected event associated with a data channel. For example, a webserver may require users to authenticate themself as valid, recognized customer of the enterprise system. The webserver may generate an authentication-failure alert element upon receiving improper authentication credentials from a customer device. The data fields of an authentication-failure alert element may contain data fields associated with the detected event, such as data fields describing the source device and data fields describing the particular customer account the user was attempting to access. The authentication-failure alert element is stored into an alert element database.

In a next step 606, using the alert elements stored in the alert element database, the security server may generate integrated alerts that are associated with customers of the system, and then store the integrated alerts into an integrated alert database. In some embodiments, the security server may generate or update an integrated alert for the customer identifier where the integrated alert is a log file or any other machine-readable code containing data fields that are populated with data that is based on the alert elements associated with the same customer identifier. In this way, regardless of the number of alert elements received for a customer identifier from the alert-generating systems or CSR computers, the integrated alert database contains only a single integrated alert for the particular customer identifier.

In a next step 608, a security server generates a risk score. When generating a new integrated alert, the security server may generate the risk score based on one or more incoming alert elements that are associated with a customer identifier of a customer. Based on the data fields of the integrated alerts, the security server may determine a risk score based on an algorithm (such as a first learning algorithm) that the security server or any other server of the system applies to the data fields of the alert elements underlying the particular integrated alert.

In some embodiments, a security server may generate the first learning algorithm configured to determine a risk associated with each of the one or more incoming alert elements. The security server may be configured to generate the first learning algorithm, modify the first learning algorithm, and execute the first learning algorithm on each of the one or more incoming alert elements. The learning algorithm may include one or more set of rules utilizing varying values and risk characteristics. In some cases, the first learning algorithm may receive an input of a first learning algorithm dataset. The first learning algorithm dataset may be used to generate and train the first learning algorithm. The first learning algorithm dataset may include data associated with a set of one or more scenario attribute models. Each scenario model of the set of one or more scenario attribute models may be computer files stored on a database device, such as a system database, and comprise a set of alert element attributes that indicate a type of scenario of potential fraud or attack. In some cases, each of the set of one or more scenario attribute models may be associated with a different rate of fraud. For example, each of the set of one or more scenario attribute models may be associated with a different percentage of fraud depending on a type of scenario of potential fraud or attack. In some instances, the security server may periodically query a database to receive updated data associated with the set of one or more scenario attribute models. The database may be a model database configured to store the data/information associated with the set of one or more scenario attribute models. The security server may then iteratively update the first learning algorithm dataset based on any updated data associated with the set of one or more scenario attribute models.

In some embodiments, the first learning algorithm may employ one or more statistical tools and one or more artificial intelligence systems, and then utilize the one or more statistical tools and the one or more artificial intelligence systems. The one or more statistical tools may include artificial neural networks techniques. For example, a neural network may include an interconnected group of artificial neurons (artificial neural network) that uses a mathematical or computational model for information processing based on a connectionist approach to computation. In some cases, the neural networks may be non-linear statistical data modeling tools or decision making tools. The neural networks may be executed to model complex relationships between inputs and outputs or to find patterns in data (such as alert elements).

The server computer may train a neural network model by selecting one model from a set of allowed models (or, in a Bayesian framework, determining a distribution over the set of allowed models) that minimizes the cost criterion. In some instances, the server computer may use one or more applications for training neural network models, which may be viewed as an application of optimization theory and statistical estimation. The applications used by a server computer in training the artificial neural networks may employ a form of gradient descent, which may be by taking a derivative of a cost function with respect to the network parameters and then changing those parameters in a gradient-related direction. The utility of artificial neural network models lies in the fact that the neural networks may be used the server computer to infer a function from observations, which is particularly useful in fraud detection applications where the complexity of the data (such as alert elements) or task makes the manual design of such a function impractical, inefficient, and time-consuming.

In a next step 610, a security server may generate a second learning algorithm configured to identify a particular type of threat associated with each respective integrated alert. The security server may be configured to generate the second learning algorithm, modify/update the second learning algorithm, and execute the second learning algorithm. The second learning algorithm may include one or more set of rules utilizing varying values and risk characteristics.

The second learning algorithm may receive an input of a second learning algorithm dataset based on data associated with a set of model attributes indicating a potential fraud scenario. For instance, the potential fraud scenario may correspond to data fields indicating type of the potential threats and nature of the potential threats such as a time-sensitive nature of the potential threats and/or a customer-sensitive nature of the potential threats. The potential fraud scenarios may be computer files stored on a database device, such as a system database, and comprise different types and nature of the potential threats.

The security server may periodically query a database to receive updated data associated with the set of model attributes indicating the potential fraud scenarios. The database may be a model database configured to store the data/information associated with the set of model attributes indicating the potential fraud scenarios. The security server may then iteratively update the second learning algorithm dataset based on any updated data associated with the set of model attributes indicating the potential fraud scenarios.

In some embodiments, the second learning algorithm may employ one or more statistical tools and one or more artificial intelligence systems, and then utilize the one or more statistical tools and the one or more artificial intelligence systems. The one or more statistical tools may include artificial neural networks techniques. For example, a neural network may include an interconnected group of artificial neurons (artificial neural network) that uses a mathematical or computational model for information processing based on a connectionist approach to computation. In some cases, the artificial neural network is in formulation and/or operation, an adaptive system that changes its structure based on external or internal information (such as the data associated with the set of model attributes indicating the potential fraud scenarios) that flows through the network. In some cases, the neural networks may be non-linear statistical data modeling tools or decision making tools. The neural networks may be executed to model complex relationships between inputs and outputs or to find patterns in data (such as integrated alerts).

In some embodiments, the neural networks for fraud detection may have multiple layers. The security server may implement a first layer of the multi-layer neural network using either a nonlinear filter or a nonlinear joint transform correlator (JTC), in association with a supervised perceptron learning algorithm. The security server may implement a second layer of the multi-layer neural network electronically due to a number of hidden layer neurons. The nonlinear filter is generally implemented electronically, while the nonlinear joint transform correlator is generally implemented electronically or optically. The neural network system may be trained with a sequence of input fraud or attach fraud scenarios, and is able to classify a potential fraud activity in real-time. In particular, the security server may train the neural network system by updating reference fraud or attach fraud scenarios in the input which can be stored in electronic memories, without the need of filters or holograms.

In some embodiments, the artificial neural network may involve a network of processing elements (artificial neurons) which may exhibit complex global behavior, determined by the connections between the processing elements and element parameters. One type of artificial neural network may be the recurrent Hopfield net. In a neural network model simple nodes, which may be called variously "neurons", "neurodes", "Processing Elements" (PE) or "units", are connected together to form a network of nodes. The server computer may further use one or more datasets (such as second learning algorithm datasets) for training the neural networks, which can be viewed as an application of optimization theory and statistical estimation. In some embodiments, the server computer may further use one or more applications for training the neural networks, which can be viewed as an application of optimization theory and statistical estimation. Such applications may include, back propagation by gradient descent, Rprop, BFGS, CG etc. Furthermore, evolutionary computation methods, simulated annealing, expectation maximization, non-parametric methods, particle swarm optimization and other swarm intelligence techniques are among other methods for training the neural networks.

Training a neural network model may mean the server computer selecting one model from a set of allowed models (or, in a Bayesian framework, determining a distribution over the set of allowed models) that minimizes the cost criterion. In some instances, the server computer may use one or more applications for training neural network models, which may be viewed as an application of optimization theory and statistical estimation. The applications used by a server computer in training the artificial neural networks may employ a form of gradient descent, which may be by taking a derivative of a cost function with respect to the network parameters and then changing those parameters in a gradient-related direction. Evolutionary methods, simulated annealing, expectation-maximization and non-parametric methods are some methods for training neural networks. Temporal perceptual learning relies on finding temporal relationships in sensory signal streams. In an environment, statistically salient temporal correlations can be found by monitoring the arrival times of sensory signals, which may be done by the perceptual network. The utility of artificial neural network models lies in the fact that the neural networks may be used the server computer to infer a function from observations, which is particularly useful in fraud detection applications where the complexity of the data (such as alert elements) or task makes the manual design of such a function impractical, inefficient, and time-consuming.

A security server may execute a second learning algorithm identify a particular type of threat for integrated alert for each respective integrated alert based upon a set of model attributes indicating a potential fraud scenario and determine the priority for these integrated alerts. For instance, integrated alerts may have a data field indicating the nature of the potential threat, and a data field indicating a time-sensitive nature or customer-sensitive nature of the potential threat. The security server then identifies a type of threat for the integrated alert for each respective integrated alert based on nature of the potential threat and a data field indicating a time-sensitive nature or customer-sensitive nature of the potential threat.

In one example, the security server may determine that an integrated alert generated based on a regulatory risk have to be addressed within a fixed period of time. In such instance, the security server starts a timer on the integrated alert associated with the regulatory risk, and when address waiting period for the integrated alert associated with the regulatory risk start getting close to the fixed time period linked to the regulatory risk alert, the security server moves the integrated alert associated with the regulatory risk into a queue that has higher priority alerts. In another example, the security server may have specific rules related to alerts associated with new customers. For instance, the security server may determine based on the specific rules related to alerts associated with new customers that the integrated alert generated for any matter related to new customers have to be addressed within a fixed period of time. In such cases, the security server starts a timer on the integrated alert associated with new customers, and when the address waiting period for the integrated alert associated with new customers start getting close to the fixed time period, the security server moves the integrated alert associated with new customers into a queue that has higher priority alerts.

Based on the priority, the integrated alerts may then be stored into dedicated databases or sub-databases of the integrated alert database where each sub-database is configured to store integrated alerts with certain types of priorities. For instance, the integrated alert is stored based on their priority into a sub-database of the integrated alert database according to the potential fraud scenario and sorted according to the relative risk score within the sub-database of the integrated alert database.

In a next step 612, a security server transmits these prioritized integrated alerts to an analyst computer. The analyst computer GUI may then receive these prioritized integrated alerts that are related to subject matter (e.g., type of threat) and/or procedural role (e.g., time-sensitive threat, backlog timing) of the respective analyst. Based on this data field, the analyst computer may receive these prioritized integrated alerts having subject matter or procedural data fields associated with the analyst credentials with rights to access the sub-database containing the prioritized integrated alert. For instance, the analyst credentials of an analyst specializing in time sensitive integrate alerts would indicate to the analyst computer that the analyst computer should retrieve and present an integrated alert having a data field indicating that the particular integrated alert is time sensitive.

In some implementations, the security server may trigger and transmit the notification to each analyst computer having analyst credentials with access attributes indicating the role of the analyst. For instance, an analyst may have analyst credentials with attributes that indicate the analyst specializes in handling time-sensitive prioritized integrated alerts. When a new prioritized integrated alert is generated or an existing integrated alert is updated with a data field indicating that the prioritized integrated alert is time sensitive, the security server or other device may transmit a notification message to the analyst computer of the analyst computer.

In some implementations, the analyst computer may include queue model that contain queues. Each of the queues may further contain one or more prioritized integrated alerts. The queues may be populated by an automated security server. In addition, an analyst, in response to a call or other inquiry from the customer, may also be to populate the queues. In an alternative embodiment, a separate system may be designed to manage risk related inquiries from customers that can populate the queues with the prioritized integrated alerts. In this alternative embodiment, investigation of a risk related inquiry can lead to the discovery of potentially fraudulent activity, and, in turn, automatically create prioritized integrated alerts for population in the queues.

Figure 7:
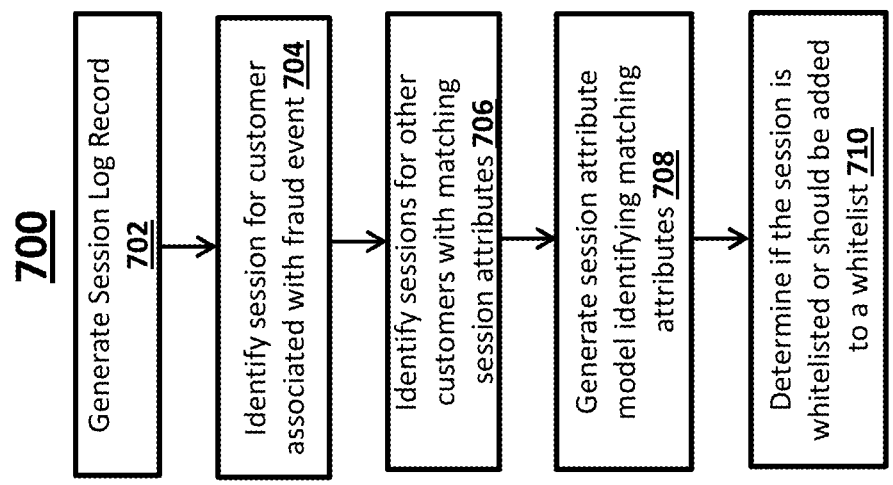
FIG. 7 shows execution of a method for automated regression model to detect fraud by analyzing web logs to find matching web-connection sessions based on dynamically generated attributes of any number of sessions, according to an exemplary embodiment.

FIG. 7 shows execution steps of automated regression model to detect fraud by analyzing web logs to find matching web-connection sessions based on dynamically generated attributes of any number of sessions, according to an exemplary method 700. The exemplary method 700 shown in FIG. 7 comprises execution steps 702, 704, 706, 708, 710. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 700 of FIG. 7 is described as being executed by a single server computer, referred to as a security server in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as the security server described herein.

In a first step 702, a security server generates session records for a web-based interaction between a customer device and a webserver. The session record generated by the security server may contain data fields related to the interaction, such as a session identifier, a timestamp, a customer identifier, and source device information identifying the customer device (e.g., IP address, MAC address). In some embodiments, the session record generated by the security server may include one or more session attributes that may include at least a device identifier uniquely identifying the customer device. The device identifier uniquely identifying the customer device is selected from a group consisting at least one of a phone number, an IP address, and a device ID.

After the generation of the session records, the security server may store the session records locally or in a database hosted on any server within the enterprise network. The security server may capture data for the session at different times of the interactions, such as capturing source device information from header portions of IP packets, or customer identifier information from an authentication attempt. In some instances, a session may transition between channels. For example, a session may begin when a user accesses the website and is properly authenticated as a customer. The user may then experience difficulties in accessing certain features or may identify certain irregularities in their account information, prompting the user to contact a CSR over the telephone. The session information for that additional contact may continue as the session transitions from a web-based channel to a telephone-based channel. The CSR may input various information fields into a GUI presented on a CSR computer, such as the purported customer who is contacting the CSR and source device information. In some instances, customer identifier data and/or source device information may be received through an automated interactive voice response (IVR) server (not shown) of a helpdesk portion of the system. The session record may contain data gathered through both the web-based interactions from customer device and the telephone-based interaction from the CSR computer and/or IVR system.

In a next step 704, a security server identify an integrated alert having a data field containing the device identifier and having a data field indicating that the integrated alert was associated with fraud in an integrated database. The integrated database contains a plurality integrated alerts associated respectively with a plurality customer identifiers.

In some embodiments, the integrated alert may be associated with a customer identifier in the integrated alert database. In some embodiments, the integrated alert may include data fields containing data from a set of one or more alert elements associated with the customer identifier. The alert element of the set of one or more alert elements may include log files. The alert element may also include machine-readable code containing data fields describing a detected event associated with a data channel.

In a next step 706, a security server may identify one or more session records of one or more other clients having session attributes matching with the one or more session attributes of the session record. For example, one of the one or more session attributes of the session record may include a session attribute that may include at least a device identifier uniquely identifying the customer device. The device identifier uniquely identifying the customer device may be a phone number, an IP address, and/or a device ID. The security server may then use one or more of the phone number, an IP address, and/or a device ID to identify the one or more other session records associated with the one or more other clients that may have the phone number, an IP address, and/or a device ID as one their attributes.

In a next step 708, a security server may generate a session attribute model identifying a number of session attributes of the one or more session records of the one or more clients matching with the one or more session attributes of the session record. In other words, the security server identifies the number of session attributes of the one or more session records of the one or more clients that are matched with the one or more session attributes of the session record where the session attribute may be selected from a group consisting of a phone number, an IP address, and/or a device ID.

In some embodiments, the security server may generate and execute a session attribute model, which may include various data trees and then generate an average across the data trees, where conditional dependencies can be built after running through a tree, scan values of variables, and then scan the values of session records, and then runs through a subsequent tree; and then uses a new variable to split the prior tree into the sub-tree.

The session attribute model may be a software model executed by the security server, which may provide fraud detection/prevention services to the users interacting with the security server via a webserver. The security server may update the session attribute model according to the instructions received from an administrator device related to various matching session attributes stored in the database. In some embodiments, the security server may update the software model records according to the instructions received from a customer device associated with various matching session attributes.

In some embodiments, the security server may generate and execute a session attribute model having one or more set of rules utilizing varying values and risk characteristics corresponding to various matching session attributes. The security server may generate the session attribute model using various matching session attribute records obtained from a third-party server. Furthermore, for a set of session attribute models, the security server may execute a re-learning process such as via a combination of a cost regression (linear model appearing as a linear regression where inputs are data points, as disclosed herein, and are fit to a response variable that indicates a survival time and leaf squares are performed to quantify an error and a gradient is dispensed to optimize a function) and a random survival forest (a collection of decision trees, where a number of trees and a depth of trees is compared and optimized as data changes/updated, such as the set of user records), where a prediction that is output from the combination are input into another cost regression model.

In some embodiments, the security server generated the session attribute model may employ one or more statistical tools and one or more artificial intelligence algorithms, and then utilize the one or more statistical tools and the one or more artificial intelligence algorithms. The one or more statistical tools may include artificial neural networks and/or Monte Carlo analysis techniques. In some embodiments, the security server generated session attribute model may define a hierarchy of data elements for describing a fraud detection product/service. The security server generated session attribute model may define the data elements that may include data sub-elements. The security server generated session attribute model may further specify data elements at various places within the hierarchy of the data elements. In some cases, the security server generated session attribute model may be customized by defining data elements that are specific to different fraud detection applications and/or systems.

In a next step 710, a security server may determine a total number of clients from the one or more clients across the one or more session records that match with the one or more session attributes of the session record. In some embodiments, the security server may execute the session attribute model to determine the total number of clients from the one or more clients across the one or more session records that match with the one or more session attributes of the session record.

The security server then determines that whether the total number of clients from the one or more clients across the one or more session records that matches with the one or more session attributes of the session record is greater or lesser than a predetermined threshold value. Upon determining that the total number of clients from the one or more clients across the one or more session records that matches with the one or more session attributes of the session record is greater than a predetermined threshold, the security server then determines whether the number of session attributes of the one or more session records of the one or more clients that matches with the one or more session attributes of the session record is in a whitelist record. The whitelist may include a list of device identifiers that have been verified and are to be ignored for fraud detection. The security server upon determining that the number of session attributes of the one or more session records of one or more clients that matches with the one or more session attributes of the session record are not in the whitelist record, updates the whitelist record by adding the number of session attributes of the one or more session records of the one or more clients that matches with the one or more session attributes of the session record into the whitelist record.

Figure 8:
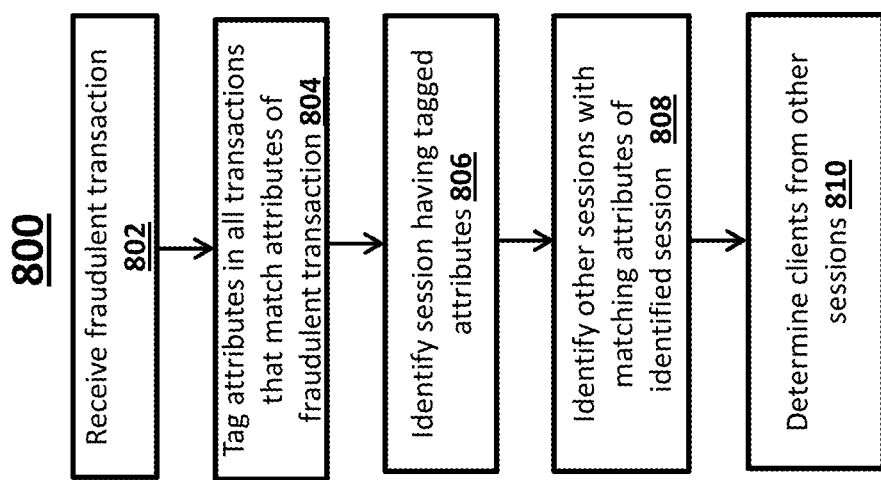
FIG. 8 shows execution of a method for automated tagging of attributes in all transactions when attributes appears in a fraudulent transaction in order to retroactively or proactively identify possible fraud events, according to an exemplary embodiment.

FIG. 8 shows execution steps of automated tagging of attributes in all transactions when attributes appears in a fraudulent transaction in order to retroactively or proactively identify possible fraud events, according to an exemplary method 800. The exemplary method 800 shown in FIG. 8 comprises execution steps 802, 804, 806, 808. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 800 of FIG. 8 is described as being executed by a single server computer, referred to as a security server in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as the security server described herein.

In a first step 802, a security server may receive a record of a fraudulent transaction associated with a client from a system database. The system database may transmit the record of the fraudulent transaction associated with the client to the security server on receiving a request from the security server. In another embodiment, a system database may automatically and periodically transmit the record of the fraudulent transaction associated with the client to the security server.

In some embodiments, these fraudulent transactions may be identified by a third-party payment server associated with a payment or transaction system that conducts payment or transactions operated by payment services systems. The third-party payment server may identify such fraudulent transactions when transaction amount is above a threshold amount or an average amount to computing devices. The third-party payment server may publish payment status records and transaction information in the record of the fraudulent transaction associated with the client in the system database. In some embodiments, these fraudulent transactions may be identified by any suitable alert-generating system of a fraud detection system.

Upon receiving the record of the fraudulent transaction associated with the client, the security server may then determine one or more attributes corresponding to the fraudulent transaction associated with the client. The one or more attributes corresponding to the fraudulent transaction associated with the client determined by the security server may include a transaction amount, a transaction date, and a transaction time.

In a next step 804, a security server may tag attributes in all transactions that matches with the one or more attributes corresponding to the fraudulent transaction associated with the client. The security server may then store the tagged attributes into a tag table within the system database.

In some embodiments, the security server may identify in an integrated database an integrated alert having a data field containing the device identifier and having a data field indicating that the integrated alert was associated with fraud. The integrated database may contain a plurality-integrated alerts associated respectively with a plurality customer identifiers. Upon the identification of the integrated alert containing the device identifier, the security server may also tag a session record having the one or more session attributes.

In a next step 806, a security server may identify a session record that may include one or more session attributes that match the tagged attributes corresponding to the fraudulent transaction associated with the client. In some embodiments, the session record being identified may be a web-based interaction between a client computer and a webserver, and contain data fields related to the interaction, such as a session identifier, a timestamp, a customer identifier, and source device information identifying the customer device (e.g., IP address, MAC address).

The security server may identify the session record having session attributes matching the tagged attributes based on matching of the attributes selected from a group consisting at least one of a phone number, an IP address, and a device ID. The security server may then store the matched session records locally or in a database hosted on any server within the enterprise network.

In a next step 808, upon the identification of the session record that may include one or more session attributes that match the tagged attributes corresponding to the fraudulent transaction associated with the client, the security server may identify one or more other session records associated with one or more clients having session attributes matching with the one or more session attributes of the session record.

In some embodiments, using the one or more session attributes from the tagged session record, the security server may identify one or more session records of one or more clients having session attributes matching with the one or more session attributes of the tagged session record.

In a next step 810, upon the security server identifying that the one or more session records associated with the one or more clients have the session attributes matching the one or more session attributes of the session record, the security server may then determine a total number of clients from the one or more clients across the one or more session records that are unique. In some embodiments, upon the security server identifying the one or more session records of one or more clients having session attributes matching the one or more session attributes of the tagged session record, the security server may then determine a total number of clients from the one or more clients across the one or more session records that are unique.

The security server may further generate new fraud alert elements for each of the unique clients and store the new fraud alert elements in an alert element database. The new fraud alert elements generated by the security server may include data fields containing data corresponding to their associated customer identifier. The new fraud alert elements generated by the security server may also include log files and/or machine-readable code containing data fields describing a detected fraudulent event associated with a data channel. Using the new fraud alerts elements stored in the alert element database, the security server may generate integrated alerts corresponding to unique clients, and then store the integrated alerts into the integrated alert database. The security server may further generate a risk score for the integrated alerts, which the security server uses to store and sort the integrated alerts according to a priority, based on the relative risk scores. Analyst computers may then query and fetch integrated alerts from the integrate alert database, and then present the integrate alerts to be addressed by an analyst according to the priority level of the respective integrated alerts.

FIG. 9 shows execution steps of to assess likelihood of fraud in each session using threshold of attribute, according to an exemplary method 900. The exemplary method 900 shown in FIG. 9 comprises execution steps 902, 904, 906, 908, 910. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 900 of FIG. 9 is described as being executed by a single server computer, referred to as a security server in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as the security server described herein.

In a first step 902, a security server generates session records for a web-based interaction between a customer device and a webserver. The session record may contain data fields related to the interaction, such as a session identifier, a timestamp, a customer identifier, and source device information identifying the customer device (e.g., IP address, MAC address). In some embodiments, the session record may include one or more session attributes that may include at least a device identifier uniquely identifying the customer device. The device identifier uniquely identifying the customer device is selected from a group consisting at least one of a phone number, an IP address, and a device ID.

The security server may store the session records locally or in a database hosted on any server within the enterprise network. The security server may capture data for the session at different times of the interactions, such as capturing source device information from header portions of IP packets, or customer identifier information from an authentication attempt. In some instances, a session may transition between channels. For example, a session may begin when a user accesses the website and is properly authenticated as a customer. The user may then experience difficulties in accessing certain features or may identify certain irregularities in their account information, prompting the user to contact a CSR over the telephone. The session information for that additional contact may continue as the session transitions from a web-based channel to a telephone-based channel. The CSR may input various information fields into a GUI presented on a CSR computer, such as an alleged identification of the purported customer who is contacting the CSR and source device information. In some instances, customer identifier data and/or source device information may be received through an automated interactive voice response (IVR) server (not shown) of a helpdesk portion of the system. The session record may contain data gathered through both the web-based interactions from customer device and the telephone-based interaction from the CSR computer and/or IVR system.

In a next step 904, a security server may identify one or more session records of one or more other clients having session attributes matching with the one or more session attributes of the session record. For example, one of the one or more session attributes of the session record may include a session attribute that may include at least a device identifier uniquely identifying the customer device. The device identifier uniquely identifying the customer device may be a phone number, an IP address, and/or a device ID. The security server may then use one or more of the phone number, an IP address, and/or a device ID to identify the one or more other session records associated with the one or more other clients that may have the same phone number, an IP address, and/or a device ID.

In a next step 906, a security server identifies a number of session attributes for each of the one or more session records of the one or more clients matching with the one or more session attributes of the session record. For example, the security server may identify one or more other clients that have session records associated with a phone number, an IP address, and/or a device ID that match with the phone number, the IP address, and/or the device ID obtained from the session record.

In a next step 908, the security server may determine a threshold value for each of the number of session attributes of the one or more session records of the one or more clients that match with the one or more session attributes of the session record. The security server may determine a threshold value for each of the number of session attributes of the one or more session records based on a pre-defined threshold criteria stored in a system database. For example, according to the pre-defined threshold criteria, a threshold value may be set for matches based on each of the attribute such as a phone number, an IP address, and/or a device ID.

The security server may further determine a probability score for likelihood of a fraud in each of the one or more session records based on a type of session attribute and a threshold value for each of the number of session attributes of the one or more session records that matches with the one or more session attributes of the session record. For example, when two customers match based on an IP address, a probability score for likelihood of a fraud may be less than a probability score for likelihood of a fraud when the two customers match based on origin host device since origin host device is a one to one match.

The security server may further sort probable frauds in each of the one or more session records based on calculated values of the probability score for likelihood of a fraud in each of the one or more session records. As an example, the security server may first address session records that have a higher value of the probability score for likelihood of the fraud.

In a next step 910, a security server may generate a new fraud alert element for clients associated with each of the one or more session records based on a probability score for the likelihood of a fraud in each of the one or more session records. The new fraud alert element may then be stored in an alert element database.

In some embodiments, the new fraud alert elements generated by the security server may include details corresponding to the type of session attributes that were matched in order to trigger generation of the new fraud alert elements. For example, a new fraud alert element may be generated by the security server when IP address is same for two customers while origin host of the two customers is different. Such new fraud alert element generated by the security server may include data fields containing data indicating that IP is matched and origin host is not matched. The new fraud alert element generated by the security server may also include data fields corresponding to their associated customer identifier. The new fraud alert elements generated by the security server may also include log files and/or machine-readable code containing data fields describing a detected fraudulent event associated with a data channel.

Using the new fraud alerts elements stored in the alert element database, the security server may generate integrated alerts that are associated with unique clients, and store the integrated alerts into the integrated alert database. The security server may generate a risk score for the integrated alerts, which the security server uses to store and sort the integrated alerts according to a priority based on the relative risk scores. Analyst computers may then query and fetch integrated alerts from the integrated alert database, and then present the integrate alerts to be addressed by an analyst according to the priority level of the respective integrated alerts.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

The invention claimed is:

1. A computer-implemented method comprising:
receiving, by a computer, a set of one or more alert elements containing a customer identifier from one or more alert-generating systems configured to generate a corresponding alert element;
storing, by the computer, each alert element into an alert element database configured to store a plurality of alert elements associated with a plurality of customer identifiers;
generating, by the computer, in an integrated alert database an integrated alert associated with the customer identifier, the integrated alert comprising one or more data fields containing data from the set of one or more alert elements associated with the customer identifier in the alert element database, wherein the integrated alert database is configured to store a plurality of integrated alerts associated with a plurality of customer identifiers;
executing, by the computer, a first learning algorithm on each respective integrated alert stored in the integrated alert database to generate a risk score for each respective integrated alert, wherein the risk score of the corresponding integrated alert is based upon the one or more data fields in the corresponding integrated alert;
generating, by the computer, a second learning algorithm configured to identify a particular type of threat associated with each respective integrated alert, wherein the second learning algorithm receives an input of a second learning algorithm dataset based on data associated with a set of model attributes indicating a potential fraud scenario;
iteratively updating, by the computer, the second learning algorithm dataset based on updated data associated with the set of model attributes, wherein the computer periodically queries a database to receive the updated data associated with the set of model attributes;

executing, by the computer, the second learning algorithm to identify the particular type of threat for the integrated alert for each respective integrated alert, wherein each integrated alert is stored into a sub-database of the integrated alert database according to the potential fraud scenario, and sorted according to the relative risk score within the sub-database; and transmitting, by the computer, a prioritized integrated alert to an analyst computer associated with a set of analyst credentials with rights to access the sub-database containing the prioritized integrated alert, whereby the analyst computer is configured to evaluate the prioritized integrated alert and deny one or more transactions associated with the customer identifier.

2. The computer-implemented method according to claim 1, further comprising:

generating, by the computer, the first learning algorithm configured to receive an input of a first learning algorithm dataset based on data associated with a set of one or more scenario attribute models, wherein each of the set of one or more scenario attribute models is associated with a different rate of fraud.

3. The computer-implemented method according to claim 2, further comprising:

iteratively updating, by the computer, the first learning algorithm dataset based on updated data associated with the set of one or more scenario attribute models, wherein the computer periodically queries a database to receive the updated data associated with the set of one or more scenario attribute models.

4. The computer-implemented method according to claim 1, wherein an alert element of the set of one or more alert elements comprises log files.

5. The computer-implemented method according to claim 1, wherein an alert element of the set of one or more alert elements comprises machine-readable code containing data fields describing a detected event associated with a data channel.

6. The computer-implemented method according to claim 1, wherein the one or more alert-generating systems are further configured to generate alert elements comprising data field associated with a type of the alert-generating system.

7. The computer-implemented method according to claim 1, further comprising:

formatting, by the computer, the one or more alert elements received from the one or more alert-generating systems.

8. The computer-implemented method according to claim 1, further comprising:

identifying, by the computer, data field entries in the integrated alert to identify one or more matches to corresponding attributes in the set of model attributes.

9. The computer-implemented method according to claim 6, further comprising:

updating, by the computer, the integrated alert upon identifying that the integrated alert matches to the corresponding attributes in the set of model attributes.

10. The computer-implemented method according to claim 9, further comprising:

deleting, by the computer, the integrated alert upon identifying that the integrated alert does not matches a pre-determined threshold number of the corresponding attributes in the set of model attributes.

11. The computer-implemented method according to claim 1, further comprising:

generating, by the computer, the risk score for each respective integrated alert in response to a triggering event, wherein the triggering event comprises receiving a new alert element for the customer identifier of the integrated alert.

12. The computer-implemented method according to claim 1, further comprising:

generating, by the computer, the risk score for each respective integrated alert in response to a triggering event, wherein the triggering event comprises when a threshold number of alert elements have been received for the customer identifier of the integrated alert.

13. A computer-implemented method comprising:

receiving, by a computer, a set of one or more alert elements containing a customer identifier from one or more alert-generating systems configured to generate a corresponding alert element;

storing, by the computer, each alert element into an alert element database configured to store a plurality of alert elements associated with a plurality of customer identifiers;

generating, by the computer, in an integrated alert database an integrated alert associated with the customer identifier, the integrated alert comprising one or more data fields containing data from the set of one or more alert elements associated with the customer identifier in the alert element database, wherein the integrated alert database is configured to store a plurality of integrated alerts associated with a plurality of customer identifiers;

generating, by the computer, a risk score for each respective integrated alert stored in the integrated alert database, wherein the risk score of the corresponding integrated alert is based upon the one or more data fields in the corresponding integrated alert;

identifying, by the computer, a type of threat for the integrated alert for each respective integrated alert based upon a set of model attributes indicating a potential fraud scenario, wherein each integrated alert is stored into a sub-database of the integrated alert database according to the potential fraud scenario, and sorted according to the relative risk score within the sub-database; and transmitting, by the computer, a prioritized integrated alert to an analyst computer associated with a set of analyst credentials with rights to access the sub-database containing the prioritized integrated alert, whereby the analyst computer is configured to evaluate the prioritized integrated alert and deny one or more transactions associated with the customer identifier.

14. The computer-implemented method according to claim 13, wherein the one or more alert-generating systems are further configured to generate alert elements comprising data field associated with a type of the alert-generating system.

15. A system comprising:

one or more alert-generating systems configured to generate an alert element;

an alert element database configured to store a plurality of alert elements; and a computer configured to:

receive a set of one or more alert elements containing a customer identifier from the one or more alert-generating systems configured to generate a corresponding alert element;

store each alert element into the alert element database configured to store the plurality of alert elements associated with a plurality of customer identifiers;

generate in an integrated alert database an integrated alert associated with the customer identifier, the integrated alert comprising one or more data fields containing data from the set of one or more alert elements associated with the customer identifier in the alert element database, wherein the integrated alert database is configured to store a plurality of integrated alerts associated with a plurality of customer identifiers;

generate a risk score for each respective integrated alert stored in the integrated alert database, wherein the risk score of the corresponding integrated alert is based upon the one or more data fields in the corresponding integrated alert;

identify a type of threat for the integrated alert for each respective integrated alert based upon a set of model attributes indicating a potential fraud scenario, wherein each integrated alert is stored into a sub-database of the integrated alert database according to the potential fraud scenario, and sorted according to the relative risk score within the sub-database; and transmit a prioritized integrated alert to an analyst computer associated with a set of analyst credentials with rights to access the sub-database containing the prioritized integrated alert, whereby the analyst computer is configured to evaluate the prioritized integrated alert and deny one or more transactions associated with the customer identifier.

16. The system according to claim 15, wherein the computer is further configured to format the one or more alert elements received from the one or more alert-generating systems.

17. The system according to claim 15, wherein the computer is further configured to:
identify data field entries in the integrated alert to identify one or more matches to corresponding attributes in the set of model attributes.

18. The system according to claim 17, wherein the computer is further configured to:
update the integrated alert upon identifying that the integrated alert matches to the corresponding attributes in the set of model attributes.

19. The system according to claim 18, wherein the computer is further configured to:
delete the integrated alert upon identifying that the integrated alert does not matches a pre-determined threshold number of the corresponding attributes in the set of model attributes.

20. The system according to claim 15, wherein the computer is further configured to:
generate the risk score for each respective integrated alert in response to a triggering event, wherein the triggering event comprises at least one of receiving a new alert element for the customer identifier of the integrated alert or when a threshold number of alert elements have been received for the customer identifier of the integrated alert.

* * * * *